US012511953B2

(12) United States Patent
Phillips et al.

(10) Patent No.: US 12,511,953 B2
(45) Date of Patent: Dec. 30, 2025

(54) EMULATION OF PETROL-BASED VEHICLE PACKAGES IN ELECTRIC VEHICLES

(71) Applicant: Adeia Guides Inc., San Jose, CA (US)

(72) Inventors: Christopher Phillips, Hartwell, GA (US); Charles Dasher, Lawrenceville, GA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 109 days.

(21) Appl. No.: 18/621,262

(22) Filed: Mar. 29, 2024

(65) Prior Publication Data

US 2025/0308298 A1 Oct. 2, 2025

(51) Int. Cl.
*G07C 5/02* (2006.01)
*G06F 9/455* (2018.01)
*B60L 15/20* (2006.01)

(52) U.S. Cl.
CPC ........... *G07C 5/02* (2013.01); *G06F 9/45508* (2013.01); *B60L 15/20* (2013.01)

(58) Field of Classification Search
CPC ........ G07C 5/02; G06F 9/45508; B60L 15/20
See application file for complete search history.

(56) References Cited

U.S. PATENT DOCUMENTS

| | | | | |
|---|---|---|---|---|
| 5,904,068 A | * | 5/1999 | Genise | F16H 61/702 477/111 |
| 7,949,452 B2 | * | 5/2011 | Eriksson | B60W 30/188 701/55 |
| 2012/0083958 A1 | * | 4/2012 | Ballard | B60W 50/10 701/56 |
| 2016/0325754 A1 | | 11/2016 | Stahulak et al. | |
| 2020/0062269 A1 | | 2/2020 | Vardharajan | |
| 2022/0041062 A1 | | 2/2022 | Nishimine et al. | |
| 2023/0106867 A1 | | 4/2023 | Chan et al. | |

OTHER PUBLICATIONS

Enginevox, Electronic active exhaust for Range Rover (Range Rover L405), available online at: <https://enginevox.com/shop/land-rover/range-rover-l405-2>, Jul. 5, 2024, 2 pages.

(Continued)

*Primary Examiner* — Gertrude Arthur Jeanglaude
(74) *Attorney, Agent, or Firm* — HALEY GUILIANO LLP

(57) ABSTRACT

Systems and methods are presented herein for emulating a petrol-based vehicle package via an electrically powered vehicle. Processing circuitry is used to identify a vehicle profile of the electrically powered vehicle. The vehicle profile comprises at least one data structure that stores emulation capabilities of the electrically powered vehicle. An emulation profile of the petrol-based vehicle package is retrieved from a data store and the emulation profile includes at least one data structure comprising instructions for rendering a vehicle characteristic of the petrol-based vehicle via the electrically powered vehicle. The vehicle profile is compared to the emulation profile. The emulation profile is transmitted to an electronic control unit in response to determining the vehicle profile is compatible with the emulation profile. The electronic control unit generates instructions for rendering one or more elements of the emulation profile based on a current operation state of the electrically powered vehicle.

20 Claims, 13 Drawing Sheets

(56) References Cited

OTHER PUBLICATIONS

Google Play, RevHeadz Engine Sounds, available online at: <https://play.google.com/store/apps/details?id=au.com.revheadz.revheadz&hl=en&pli=1>, Apr. 26, 2024, 4 pages.

Kukreja, S., et al., "Porsche Taycan Turbo S beats Tesla Model S Plaid to Become the fastest EV around the Nurburgring", available online at: <https://timesofindia.indiatimes.com/auto/electric-cars/porsche-taycan-turbo-s-beats-tesla-model-s-plaid-to-become-the-fastest-ev-around-the-nurburgring/articleshow/93591597.cms>, Aug. 16, 2022.

Sathurshan, "Did You Know Harley-Davidson Tried To Trademark Their Exhaust Sound?", IMotorbike, available online at: <https://imotorbike.my/news/2020/01/harley-davidson-sound-trademark/#:~:text=In%201994%20Harley%20filed%20a,Harley's%20registrability%20for%20the%20trademark.&text=As%20we%20all%20know%2C%20Harley,its%20distinctive%20design%20and%20sound.>.

Shin Daniel, "Safe and sound: how EVs tell you they're coming", Muck Rack, available online at: <https://muckrack.com/podcast/MarketplaceTechPodcast/episodes/8108386-safe-and-sound-how-evs-tell-you-theyre-com/>, May 29, 2023, 2 pages.

Wikipedia, "Rimac Nevera", available online at: <https://en.wikipedia.org/wiki/Rimac_Nevera>, May 21, 2024, 7 pages.

\* cited by examiner

EMULATION OF PETROL-BASED VEHICLE PACKAGES IN ELECTRIC VEHICLES

INTRODUCTION

The present disclosure is directed to systems and methods for emulating operation of combustion engine vehicles with automatic or manual transmissions using an electrical vehicle (hereinafter "EV") based on an emulation profile and, more particularly, to systems and methods that provide access to emulation profiles for modifying operational parameters of an EV to cause the EV to emulate operation of a non-electric powertrain variant of the EV or other non-electric powertrain vehicles with similar configurations to the EV.

SUMMARY

With the growth of the EV market, there has developed a desire to reach vehicle consumers who developed an affiliation for certain performance metrics or performance criteria associated with non-electric powertrain vehicles. For example, increased rates of acceleration, increased speed ranges, and audio outputs of the non-electric powertrain vehicles have become characterizing elements of these vehicles. In order to expand the reach of EVs, preferably a means of emulating the characterizing performance metrics and other related outputs of these non-electric powertrain vehicles would enable EV consumers to retain access to these preferred performance metrics and related vehicle outputs. Although certain manufacturers may offer EV vehicles that share certain performance metrics of non-EV variants of the EV vehicles (e.g., acceleration and top speed), there remains certain aspects of the non-electric powertrain vehicle that are not emulated in circulated EVs. For example, there are certain sounds and feels that come with operating a non-EV that are not present when operating an EV variant of a related vehicle (e.g., related to exhaust sounds and combustion engine operation).

A known operating parameter of combustion engines is a torque curve. The torque curve may be characterized by a graph or ranges of operating windows, depending on other variables affecting operating conditions of a powertrain actuated by a combustion engine. The torque curve represents the engine's torque output across a range of engine speeds, or engine revolutions per minute (hereinafter "RPMs"). When plotted, the torque curve provides a visual representation of a magnitude of twisting force, or torque, that the engine corresponding to the torque curve products at different magnitudes of RPMs. Considering the effect of engine torque on a number of vehicle operational parameters (e.g., rate of acceleration, ability to traverse certain inclined slopes, or towing capacity), the engine torque is an operational parameter that can be utilized to emulate a vehicle level response to make an EV without a combustion engine sound and feel like a non-EV that is related to the EV by at least one assembly configuration (e.g., wheel base, weight, suspension type, suspension height, wheel or tire size).

Considering the history of torque output being utilized to characterize a vehicle's performance, there are three trends that assist with the development of emulation of non-EVs using an EV based on torque curves. First, torque output of combustion engines is generally lower when the RPMs are at a lower end of a particular engine's ranges of RPMs. As a result, there is a general consensus that a combustion engine will be less responsive at the lower end of the RPM magnitude. Accordingly, smooth acceleration may require downshifting or elevated throttle input as compared to other RPM ranges. Second, a middle portion of the torque curve is typically where a peak torque of the engine is generated. This middle portion is considered where an engine operates while using the vehicle for daily driving. The engine is considerably more responsive to throttle inputs and the engine also produces the most consistent torque outputs. Third, torque output is expected to decrease as a combustion or reaction engine outputs higher RPM ranges. As a result, sports cars tuned for precision or "high" performance may tune their powertrains to have a peak torque output magnitude at relatively high RPM values and, therefore, require higher inputs to the powertrains (e.g., higher revolution rates) to result in a maximum performance of the powertrain.

When torque outputs of powertrains are plotted, the data forms a particular shape as defined by a torque curve over an axis of the torque output plot. The shape of the torque curve characterizes how a car is expected to perform in different driving conditions. For example, a first engine may generate a torque curve that is predominantly flat which means there is a maintenance of a consistent torque output across a broad RPM range. This first engine may cause a vehicle occupant to consider a vehicle utilizing the first engine to feel more effortless to drive in various situations. In another example, a second engine with a torque curve that changes between peaks and valleys when plotted over time or over RPMs can result in most of the torque outputs being concentrated at a specific RPM range. A vehicle with this second engine might feel more sensitive to vehicle occupant operation inputs (e.g., one or more of steering, throttle, or brake inputs). This second engine may require more precise gear shifting to stay within the optimal power band and, therefore, creates a need for a separate data structure for creating an emulation profile.

When comparing different cars (e.g., vehicle assemblies with one or more of different suspensions or different powertrains) or evaluating performance (e.g., outputs of individual subsystems or measurables that characterize handling of the cars on different tracks or terrains) between the different cars, the torque curve provides a means to visually characterize and provide values to how the engines of each respective different car delivers power and how each different car might perform in various driving scenarios. Manufacturers often provide torque curve charts or graphs in technical specifications to give potential buyers a better idea of the engine's behavior.

Across petrol-based vehicle builds, aficionados of particular builds can often detect differences between torque curves and this detectable difference provides these aficionados with an objective metric for quantifying preferred vehicle operational experiences. Since EVs have motors (e.g., for actuating or rotating road wheels) that generate a seemingly instantaneous torque (e.g., based on a step function), the torque output of these motors generates a relatively flat curve that, in certain vehicles, will decrease in magnitude at higher EV road speeds. The result of this different application of torque output is that EV torque curves are generally considered as lacking the variation between individual petrol-based vehicle torque curves as the seemingly instantaneous torque results in a curve that, when plotted, remains relatively flat after the initial impulse to start the movement of interfacing EV components. The magnitude of the torque output when plotted results in steep, almost vertical, slope at the beginning of the EV torque curve and the peak magnitude of the torque output is related to the horsepower the EV motor produces.

Another consideration of emulation of vehicles with petrol engines using EV builds is that petrol engines produce vibrations that are absent in an EV (e.g., considering the lack of petrol engine) and these petrol engines are known to cause a perceivable shake at the vehicle level (e.g., considering the internal components rotating at elevated velocities). This perceivable shake is typically most detectable, or perceivable, when the petrol vehicle is operating in an idle state. This idle state, and other petrol engine operational states, is accompanied by sounds that have correlated magnitudes and frequencies produced at least in part based on a number of combustion, or reaction, cylinders in the petrol engine as well as the overall engine design (e.g., including mounting assemblies and strategies) as well as camshafts installed by the manufacturer. Preferably, an emulation strategy is provided that enables aficionados of petrol engine vehicle builds to perceive such feelings and sounds when using an EV build during similar scenarios that would cause a petrol engine vehicle to operate in idle (e.g., such as stopping at a red light or traveling at low vehicle speeds in traffic or through a parking lot).

This invention is a vehicle emulation profile purchasing and loading system that provides a means for users to purchase and load emulation profiles defined by the manufacturer for vehicles onto that manufacturer's electric vehicles. This system includes the manufacturer's vehicle store app which is displayed on one or more of the vehicle infotainment system or a display of a mobile device (e.g., through an application accessible by a mobile device such as a smart phone), where users can browse and purchase emulation profiles for various vehicles. The emulation profiles contain information such as engine specifications, transmission gear ratios, final drive gear ratios, manual gear shift patterns, tire size, weight, paint codes (e.g., exterior paint or body panel paint) and other vehicle build characteristics that are known to provide differences in measurable and replicable vehicle performance metrics. Once a user has purchased an emulation profile, the infotainment system provides an interface for the user to view the vehicles purchased and select a vehicle from their virtual garage to for emulation.

Once selected, the interface communicates with the vehicle's onboard ECUs (Electronic Control Units), allowing the emulation profile to be installed and activated. Once the emulation profile is installed, the user can then drive their electric vehicle simulating the vehicle profile that they purchased and selected from their virtual garage. This allows users to experience the performance characteristics of different vehicles without having to own them and also provides users with additional personal modification options for their EV. The invention is expected to have significant benefits for car enthusiasts, as well as for those who want to experience different petrol-based vehicle performance characteristics without having to purchase any petrol vehicles. Additionally, the system is expected to be an attractive feature for electric vehicle manufacturers, as it would add significant value to their vehicles and encourage sales, especially for loyal brand followers that have historically produced performance petrol-based vehicles.

In some embodiments, the disclosure is directed to a method for emulating a petrol-based vehicle package via an electrically powered vehicle. Processing circuitry is used to identify a vehicle profile of the electrically powered vehicle, wherein the vehicle profile comprises at least one data structure that stores emulation capabilities of the electrically powered vehicle. An emulation profile of the petrol-based vehicle package is retrieved from a server, wherein the emulation profile comprises at least one data structure comprising instructions for rendering a vehicle characteristic of the petrol-based vehicle via the electrically powered vehicle. The vehicle profile is compared to the emulation profile. In response to determining the vehicle profile is compatible with the emulation profile based on the comparing, the emulation profile is transmitted to an electronic control unit. The electronic control unit generates instructions for rendering one or more elements of the emulation profile based on a current operation state of the electrically powered vehicle.

In some embodiments, the disclosure is directed to a method for emulating manually shifting gears of a transmission in a vehicle without a transmission configured for manual shifting of gears of the transmission. Processing circuitry is used to determine, based on a vehicle build data structure, that the vehicle lacks a transmission configured for manual shifting of the gears of the transmission. A shifter emulation profile is retrieved from a server, wherein the shifter emulation profile is generated by an administrator of the server. Based on the shifter emulation profile, at least one vehicle response profile is generated that comprises computer readable instructions for at least one control unit of the vehicle to execute during one or more operation states of the vehicle. One or more sensors are activated that collect motion data corresponding to a passenger compartment of the vehicle. Based on the motion data, processing circuitry determines one or more manual shifting motions is being performed (e.g., by a vehicle occupant). The processing circuitry causes the at least one control unit to execute at least a portion of the at least one vehicle response profile based on the one or more manual shifting motions being performed to cause a vehicle response corresponding to the shifter emulation profile.

This disclosure provides advantages over the current aforementioned approaches by combining attributes to enable petrol vehicle emulation in an EV to generate a replicable and sustainable emulation experience that provides an occupant of the EV with the experience of operation a real world petrol-based vehicle build. By creating a means for intelligently aligning operational capabilities of the EV with operational outputs of the petrol-based vehicle build, the sets of data and data structures described herein enable EV owners to access the operational experiences of a manufacturers other vehicles (e.g., the petrol-based counterparts of the EV build). Additionally, this disclosure incorporates embodiments where emulation can be one or more of EV location-based as well as context-based (e.g., corresponding to one or more known or documented regulations of a current EV location). In some embodiments, this disclosure incorporates an interface that can be considered a virtual garage of vehicles and emulation profiles to allow a vehicle owner to pick between profiles and vehicles when operating one or more vehicles in the real world. Additionally, or alternatively, physical limitations of an EV build, overrides of activated emulation profiles (e.g., for rapid deactivation for manual vehicle occupant intervention), as well as modifying activated emulation modes based on locations are described herein in order to provide additional operational context for these emulation profiles.

The various systems and methods of this disclosure include various manners of emulating a gear shift in a vehicle without a manual transmission, various forms of haptics-based feedback for EV occupant perception, as well as means for detecting foot and hand gestures (e.g., corresponding to the concept of "air shifting" where an individual performs foot and hand motions that, when paired with a manual transmission, correlate to shifting activities). These gestures can, in some embodiments, be paired with optional haptic and tactile feedback as replicated by feedback apparatuses (e.g., gloves) and as enabled by end user devices communicatively coupled to the vehicle (e.g., such as a personal smart mobile device with an interactive interface).

In some embodiments, a vehicle occupant mobile device (e.g., a smart phone or other suitable apparatus) is communicatively coupled to the vehicle and includes processing circuitry for facilitating generation of interactive interfaces through a programmed application. The application of the mobile device can utilized outputs from a vehicle network of the EV. In some embodiments, the application can interface with an OBD II port or connection interface of the EV in order to receive data from the EV to receive criteria for generating sounds that are considered a part of an immersive emulation experience of a petrol-based vehicle package engine sounds in the EV. Considering that not all EV builds include an OBD II port, proprietary mechanical extensions for connection interfaces or other proprietary connection interfaces may be provided in certain EV builds to enable a connection. The connection interface between devices of this disclosure is intended to enable generation of sound and replication of other elements of an emulation profile based on a current vehicle operating state such that multiple elements of the EV are activated and providing data to different control units for updating what is generated for an more immersive emulation experience that goes beyond simple sound emulation. The emulation of this disclosure can be based on vehicle outputs, vehicle performance, and other loads generated by the EV while attempting to emulate the petrol-based build.

The engine sounds of a real world petrol-based vehicle package can be correlated to engine component RPMs and gear shift data that characterize dynamic outputs from the petrol-based vehicle as characterized by a data structure that organizes and stores related to the emulation package. In some embodiments, one or more of at least one torque curve, at least one RPM calculation (e.g., to correlate an equivalent EV RPM to a petrol-based engine RPM), at least one engine noise characteristic, or at least one exhaust noise characteristic is incorporated into the emulation profile data structure in order to enable an EV vehicle that is rendering an emulation experience to provide realistic noise feedback for vehicle occupant perception.

In some embodiments, the emulation capabilities of the electrically powered vehicle comprise one or more of suspension damping rates, suspension adjustment width, suspension adjustment height, sound replication, vehicle exterior replication, motor torque replication, engine torque replication, or haptic feedback for a passenger compartment. In some embodiments, the server, or data store (e.g., a local device accessible at a dealership with emulation profiles preloaded for providing to an EV of an emulation profile purchaser), has access to a plurality of emulation profiles. Each emulation profile of the plurality of emulation profiles is generated based on vehicle characteristics of various vehicles produced by one or more vehicle manufacturers. In some embodiments, a vehicle manufacturer of the electrically powered vehicle is determined based at least in part on the vehicle profile. The vehicle manufacturer can be utilized at least in part to identify one or more emulation profiles available via the vehicle manufacturer.

In some embodiments, the processing circuitry is used to compare vehicle configuration information of the vehicle profile to vehicle configuration information corresponding to the one or more emulation profiles. Based on the comparing, the processing circuitry identifies at least one of the one or more emulation profiles that shares at least one element of vehicle configuration information with the vehicle profile. A selectable icon corresponding to the at least one of the one or more emulation profiles at one or more of the electrically powered vehicle or a device communicatively coupled to the electrically powered vehicle is generated for display.

In some embodiments, the processing circuitry is used to generate a data structure for storing the retrieved emulation profile and additional emulation profiles, wherein the data structure is accessible via the electronic control unit. The electronic control unit retrieves one or more of the retrieved emulation profile or at least one of the additional emulation profiles based on the current operation state. The data structure for storing the retrieved emulation profile and additional emulation profiles arranges, via the processing circuitry, the retrieved emulation profile and additional emulation profiles in memory based on a vehicle access setting corresponding to access rights of one or more operators of the electrically powered vehicle.

In some embodiments, the processing circuitry is used to identify one or more priority flags corresponding to one or more elements of the retrieved emulation profile. Based on the one or more priority flags, the processing circuitry is configured to determine at least one emulation capability required for rendering the retrieved emulation profile. The at least one emulation capability is compared to the vehicle profile. A determination is made using the processing circuitry that the vehicle profile comprises at least one element of the at least one data structure that indicates the electrically powered vehicle is compatible with the emulation profile. Additionally, or alternatively, the current operation state is identified based on data transmitted throughout a communication network of the electrically powered vehicle. The transmitted data comprises at least one data structure indicating one or more electronic control units of the electrically powered vehicle are currently in use for operation of the electrically powered vehicle. The transmitted data communicates one or more of a drive mode of the electrically powered vehicle, a passenger type, a planned destination, a planned route, a current location, or a power mode of the electrically powered vehicle.

In some embodiments, the administrator of the server corresponds to one or more vehicle manufacturers. Additionally, or alternatively, the processing circuitry facilitates identifying a manual transmission vehicle build data structure that has at least one element of the vehicle build data structure. A query is transmitted to the server based on the manual transmission vehicle build data structure. The server interfaces with the processing circuitry to identify the shifter emulation profile, wherein the shift emulation profile corresponds to at least one element of the manual transmission vehicle build data structure. A first sensor of the one or more sensors is arranged within the passenger compartment to capture hand motions performed within the passenger compartment. A second sensor of the one or more sensors is arranged within the passenger compartment to capture foot motions performed within the passenger compartment. The one or more manual shifting motions comprises one or more of a hand motion corresponding to directional changes of a shifter within a manual transmission or a foot motion corresponding to pressing and releasing a clutch pedal.

In some embodiments, the processing circuitry facilitates generating a gear pattern for display corresponding to the shifter emulation profile, wherein the gear pattern is accessible via the passenger compartment. The gear pattern is updated for display based on the motion data and the at least one vehicle response profile. The motion data comprises at least one hand motion indicative of a modification to the gear pattern and at least one foot motion corresponding to an interaction with a clutch pedal. The shifter emulation profile is a data structure of a vehicle emulation profile. The vehicle emulation profile comprises a plurality of data structures comprising computer readable instructions that, when executed by the processing circuitry, cause one or more control units of the vehicle to emulate a comparable vehicle characterized by the vehicle emulation profile. In some embodiments, the shifter emulation profile is stored in a memory of the vehicle based on operational permissions stored in the memory.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Methods and systems are provided herein for emulating a petrol-based vehicle package via an electrically powered vehicle.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

Figure 1:
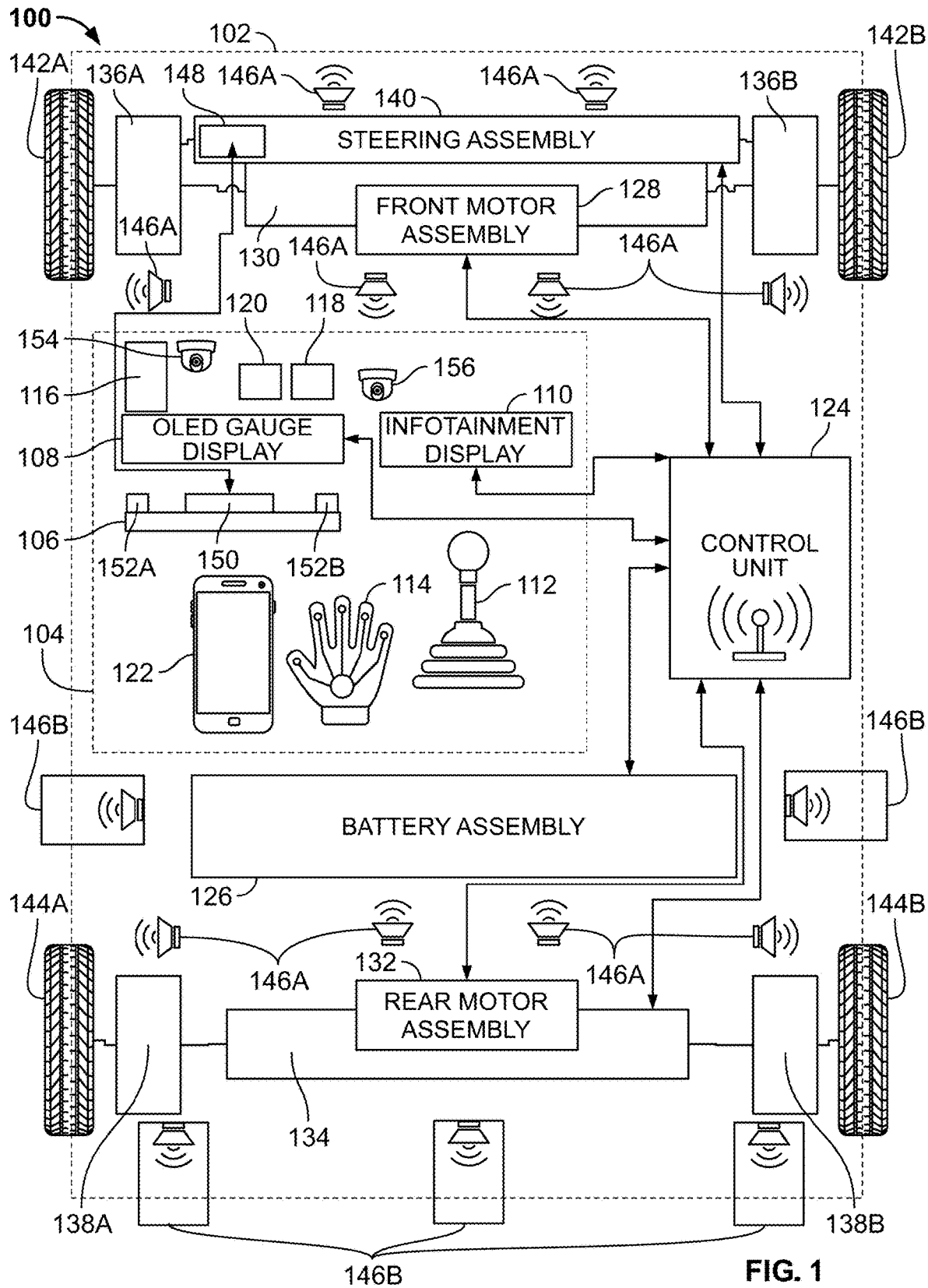
FIG. 1 depicts an EV system configured to emulate a petrol-based vehicle assembly based on an emulation package, in accordance with some embodiments of the disclosure.

FIG. 1 depicts EV system 100 that is configured to emulate a petrol-based vehicle assembly based on an emulation package, in accordance with some embodiments of the disclosure. EV system 100 may incorporate, or be incorporated into, each of the embodiments depicted in FIGS. 2-4. Additionally, or alternatively, EV system 100 comprises one or more control units, processors, control circuitry, or processing circuitry configured to execute computer readable instructions, provided through transmission or processing of a non-transitory computer readable medium for, that provide protocols for performing one or more elements of any of the processes of FIGS. 5-12.

EV system 100 comprises vehicle body 102 that houses, or includes, other components of EV system 100. Vehicle body 102 incorporates occupant compartment 104, which is where a user of EV system 100 can operate EV system 100 from within vehicle body 102. For example, occupant compartment 104 comprises at least one seat to allow a vehicle occupant to access one or more of steering apparatus 106, OLED gauge display 108, infotainment display 110, shifter accessory 112, haptics glove 114, clutch emulation assembly 116, EV throttle apparatus 118, or EV brake apparatus 120. As shown in FIG. 1, smart mobile device 122 is also accessible within occupant compartment 104. In some embodiments, smart mobile device 122 can be positioned anywhere relative to vehicle body 102 or occupant compartment 104 in order to provide communicative access between smart mobile device 122 and control unit 124 of EV system 100. Smart mobile device 122 comprises processing circuitry that enables wireless communication between smart mobile device 122 and processing circuitry, control circuitry, or at least one processor of another device that is configured to communicate on a same network or through a same interface. For example, smart mobile device 122 and infotainment display 110 may both interface with each other and control unit 124 based on one or more of a local network or a vehicle network of EV system 100. One or more of smart mobile device 122 or infotainment display 110 are, in some embodiments, configured to display an interactive interface of an application for viewing, scrolling through, and selecting one or more emulation profiles for transmitting to control unit 124 in order for EV system 100 to have a data structure for providing rendering criteria for execution by one or more components of EV system 100 for perception of at least an occupant within occupant compartment 104.

Smart mobile device 122 may be a smartphone device, a tablet, a virtual reality or augmented reality device, or any other suitable device capable of processing data corresponding to an EV vehicle emulation profile application and related supplemental content described in this disclosure. In another example, one or more of infotainment display 110 or control unit 124 comprise processors and circuitry for processing data corresponding to an EV vehicle emulation profile application. In some embodiments, one or more of smart mobile device 122 or infotainment display 110 are capable of generating for display an input interface for receiving vehicle occupant inputs related to the EV vehicle emulation profile application. Where one or more of smart mobile device 122 or infotainment display 110 are removable from vehicle body 102, either or both component may be considered a remote-control device with respect to activating rendering related to a selected vehicle emulation profile. Any, or each, of smart mobile device 122, infotainment display 110, or control unit 124 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Any, or each, of smart mobile device 122, infotainment display 110, or control unit 124 may receive content and data via one or more designated input/output (I/O) paths (e.g., circuitry), which may communicatively interfaces with one or more processors of these components with each other to create a series of communication paths throughout EV system 100. For example, the one or more I/O paths may provide content (e.g., broadcast programming, on-demand programming, Internet content, content available over a local area network (LAN) or wide area network (WAN), and/or other content) and data to control unit 124, which may be configured to operate as a central data hub within EV system 100. Any suitable computing device having processing circuitry, control circuitry, and storage may be used in accordance with the present disclosure. For example, any of smart mobile device 122, infotainment display 110, or control unit 124 may be replaced by, or complemented by, a personal computer (e.g., a notebook, a laptop, a desktop), a smartphone (e.g., smart mobile device 122), a tablet, a network-based server hosting a user-accessible client device, a non-user-owned device, any other suitable device, or any combination thereof.

As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 208 executes instructions for an immersive advertisement insertion application or algorithm paired with one or more other entertainment applications stored in memory. In some implementations, processing or actions performed by control circuitry of this disclosure may be based on instructions received from an EV emulation profile access application or algorithm paired with one or more other applications (e.g., applications that access, retrieve, and provide additional data based on one or more of EV build data or emulation profile data).

In client/server-based embodiments, control circuitry (e.g., one or more processors, processing circuitry, or control units of this disclosure) may include communications circuitry suitable for communicating with a server or other networks or servers. The EV emulation profile access application, or algorithm, paired with one or more other entertainment applications may be a stand-alone application implemented on a device or a server. The application, or algorithm, paired with one or more other applications may be implemented as software or a set of executable instructions. The instructions for performing any of the embodiments discussed herein of the immersive advertisement insertion application or algorithm paired with one or more other entertainment applications may be encoded on non-transitory computer-readable media (e.g., a hard drive, random-access memory on a DRAM integrated circuit, read-only memory on a BLU-RAY disk, etc.).

In some embodiments, the application, or algorithm, paired with one or more other emulation related applications may be a client/server application where only the client application resides on one or more circuitries described in reference to EV system 100, and a server application resides on an external server (e.g., a server or data store remote from EV system 100 that is communicatively accessibly by one or more processors or circuitry described in reference to EV system 100). For example, the application or algorithm paired with one or more other applications may be implemented partially as a client application on control circuitry one or more elements of EV system 100 and partially on the aforementioned remote server or data store as a server application running on control circuitry of EV system 100. The remote server, or data store, may be a part of a local area network with one or more computing devices, or may be part of a cloud computing environment accessed via the internet. In a cloud computing environment, various types of computing services for performing searches on the internet or informational databases, providing seamless virtual space traversing capabilities, providing storage (e.g., for a database) or parsing data (e.g., using machine learning algorithms) are provided by a collection of network-accessible computing and storage resources referred to as "the cloud." Any, or each, of smart mobile device 122, infotainment display 110, or control unit 124 may be a cloud client that relies on the cloud computing capabilities from the remote server, or data store, to determine whether processing (e.g., at least a portion of virtual background processing and/or at least a portion of other processing tasks) should be offloaded from the mobile device, and facilitate such offloading.

Any, or each, of smart mobile device 122, infotainment display 110, or control unit 124 may include communications circuitry suitable for communicating with a server, edge computing systems and devices, a table or database server, or other networks or servers. The instructions for carrying out the above mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths. In addition, communications circuitry may include circuitry that enables peer-to-peer communication of user equipment devices, or communication of user equipment devices in locations remote from each other.

Memory may be an electronic storage device that is part of any, or each, of smart mobile device 122, infotainment display 110, or control unit 124. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. The storage may be used to store various types of content described herein as well as immersive video application data described above. Nonvolatile memory may also be used (e.g., to launch a boot-up routine and other instructions). Cloud-based storage may also be used to supplement storage.

Any, or each, of smart mobile device 122, infotainment display 110, or control unit 124 may include video generating circuitry and tuning circuitry, such as one or more analog tuners, one or more video decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Scaler circuitry for up converting and down converting content into the preferred output format of any, or each, of smart mobile device 122, infotainment display 110, or control unit 124. In some embodiments, any, or each, of smart mobile device 122, infotainment display 110, or control unit 124 may also include digital-to-analog converter circuitry and analog-to-digital converter circuitry for converting between digital and analog signals. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage is provided as a separate device from any, or each, of smart mobile device 122, infotainment display 110, or control unit 124, the tuning and encoding circuitry (including multiple tuners) may be associated with the storage.

Any, or each, of smart mobile device 122, infotainment display 110, or control unit 124 may receive instruction from a user by way of a user input interface (e.g., as generated for display on infotainment display 110 with corresponding input/output processing capabilities). Any suitable user interface, such as a remote control, mouse, trackball, keypad, keyboard, touch screen, touchpad, stylus input, joystick, voice recognition interface, or other user input interfaces may, in some embodiments, be integrated into infotainment display 110 or smart mobile device 122. Infotainment display 110 or smart mobile device 122 may be provided as a stand-alone device or integrated with other elements of each one of control unit 124 or EV system 100. For example, infotainment display 110 may be a touchscreen or touch-sensitive display.

In some embodiments, infotainment display 110 or smart mobile device 122 may be one or more of a monitor, a television, a liquid crystal display (LCD) for a mobile device, amorphous silicon display, low-temperature poly-silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to infotainment display 110 or smart mobile device 122.

Vehicle body 102 includes control unit 124. Control unit 124 is any suitable combination of processors and circuitry for operating as a vehicle network hub that sends and retrieves data corresponding to performance metrics or outputs of one or more of battery assembly 126, front motor assembly 128, front axle transmission assembly 130, rear motor assembly 132, rear axle transmission assembly 134, front corner suspension apparatuses 136A and 136B, rear corner suspension apparatuses 138A and 138B, steering assembly 140, or any other element shown in or described in reference to EV system 100. For example, control unit 124 may be configured to receive, record, or transmit one or more data elements related to rotational outputs of front motor assembly 128 or rear motor assembly 132 such that front axle transmission assembly 130 causes front wheels 142A and 142B to rotate or rear axle transmission assembly 134 causes rear wheels 144A and 144B to rotate, thereby causing vehicle body 102 to translate based on a direction of rotation of the wheels. Additionally, or alternatively, control unit 124 may be configured to receive, record, or transmit one or more data elements that characterize an operating state or power output of battery assembly 126 (e.g., based on a priority or hierarchy ranking of operation of one or more components shown in or described in reference to EV system 100). Control unit 124 may be considered a conduit of data processed, transmitted, or received throughout a vehicle data network that communicatively couples one or more modules of EV system 100 in order to provide parameters for emulating one or more elements of a selected vehicle emulation profile.

EV system 100 includes vehicle modules, or components, that transmit and process data using a vehicle network that is represented by the various connecting lines shown in FIG. 1, both lines with and without arrows. The vehicle network that causes intra-vehicular data transmission, and processing thereof, incorporates any suitable communication network architecture for providing sensor data, module data, or any suitable form of data from a first module, or processor, to a second module, or processor, in order to generate, transmit, and execute various operations for suitable EV operation in varying conditions. For example, the vehicle network may be considered a vehicle bus corresponding to a specializes internal communications network that interconnects components, subsystems, or subassemblies of the vehicle. A vehicle bus is an apparatus or arrangement of devices for interfacing multiple devices for operation of a larger architecture or system (e.g., an EV or system thereof). The vehicle network of this disclosure enables control of various components, systems, or subsystems of EV system 100, for example, based on various requirements for message, or data, delivery by eliminating conflicting data transmission while also providing adequate redundancies to avoid single point failures within EV system 100. In some embodiments, the vehicle network of EV system 100 utilizes one or more suitable networking protocols such as one or more of Controller Area Network (CAN) or Local Interconnect Network (LIN). The speed of data or message transmission and subsequent processing thereby for operating an EV may, in some embodiments, be dependent on the nature of processors, processing circuitry, and complexity of message conflict reviews.

In some embodiments, one or more of smart mobile device 122, infotainment display 110, or control unit 124 incorporate processing circuitry and computer readable instructions that correspond to a gateway, or central authority, for enabling communication between, for example, smart mobile device 122, infotainment display 110, or control unit 124, and any components or interfaces therebetween. EV system 100 involves communication between one or more of processors, modules, or processing circuitry. The data transmission therebetween, as with telecommunication hard wired or wireless networks, requires monitoring and management by a central authority or a combination encoder and decoder. This central authority become pivotal to operation of EV system 100 where wireless or ethernet connections involve acquiring information from remote servers or communicatively coupled devices subjected to different security protocols. The gateway of this disclosure comprises a central authority that functions as a hub for interconnecting different processors, modules, and processing circuitry throughout EV system 100 to enable secure and reliable transmission of data and instructions thereby in a manner that allows efficient and accurate processing upon receipt of the data and related instructions. In some embodiments, the gateway is configured to provide multiple translations (e.g., of one or more of signal names or signal addresses) between different circuitries (e.g., converting what one circuitry considered engine RPM to road wheel motor RPM with appropriate scaling of values).

In some embodiments, the gateway is configured for one or more of generating and maintaining message and data processing firewalls, converting messages and data between processors to adequately secured and encrypted data transmission, or security and authorization key management (e.g., enabling or disabling access of different modules or processors to certain information). Additionally, or alternatively, the gateway may be configured for processing both nominal and elevated bandwidth inter-processor or inter-module communication and data transfers within the vehicle. The gateway may also be configured for providing on-board diagnostics and remote monitoring of the vehicle as well as individual systems, components, or subsystems of the vehicle or interfacing with the vehicle (e.g., for generating and diagnosing trouble codes indicating issues with one or more nodes of a vehicle network or a system comprising a vehicle with an internal network). The gateway of this disclosure is capable of advanced routing for enabling efficient multiple protocol translations between different devices, components, or interfaces (e.g., smart mobile device 122, infotainment display 110, or control unit 124). In some embodiments, EV system 100 is configured for Over-The-Air (hereinafter "OTA") software updates to the computer readable instructions and protocols used throughout the system by one or more components or subsystems of this disclosure. The gateway is configured to facilitate OTA software updates by forward appropriate batches of data, software, and messages to target destinations (e.g., one or more processors or modules).

Arranged through EV system 100 and vehicle body 102 are a plurality of components configured for rendering outputs based on a selected emulation profile. As shown in FIG. 1, there is a plurality of audio output devices 146A for generating audio outputs based on a selected emulation profile that are arranged to enhance a vehicle occupants emulation experience. Additionally, there is a separate plurality of tubed audio output devices 146B for generating audio outputs based on a selected emulation profile to enhance the quality of vehicle emulation for those external to occupant compartment 104. Any suitable audio output device (e.g., any suitable speaker assembly or apparatus) may be used in place of audio output devices 146A and tubed audio output devices 146B for generating audio outputs based on a selected emulation profile. Tubed audio output devices 146B are considered to function as or function similar to amplifiers such that appropriate harmonics are generated to provide a desired audio output to those external to occupant compartment 104 during operation of EV system 100.

Steering assembly 140 is shown as interfacing with steering apparatus 106. Steering assembly 140 provides at least a mechanical interface between steering input interface 148 and one or more of front corner suspension apparatuses 136A and 136B. Steering input interface 148 may be configured for one or more of steer-by-wire, a redundant steer-by-wire arrangement with a clutch actuated mechanical steering connection, or a permanently affixed mechanical steering connection. For example, steering input interface 148 may include one or more of a splined steering input shaft for interfacing with a steering column, a clutch actuated steering input shaft that engages a steering column based on the steering column clutch position, or one or more processors and related circuitry for local network, vehicle network, or other suitable wireless network communication between steering apparatus 106 and steering assembly 140. In some embodiments, EV system 100 comprises one or more of an additional or alternative steering apparatus configured to manipulate road wheel angles of rear corner suspension apparatuses 138A and 138B based on road wheel angles of rear wheels 144A and 144B. Steering apparatus 106 also includes steering haptics control unit 150 as well as paddle shifters 152A and 152B. Steering haptics control unit 150 is configured to generate perceivable haptic feedback to an occupant of occupant compartment 104 through steering apparatus 106. Steering apparatus 106 may be comprised of any suitable steering wheel or steering controller assembly for providing occupant steering inputs to steering assembly 140 through steering input interface 148. Paddle shifters 152A and 152B are arranged on steering apparatus 106 and function as an alternative shifter clutch input means to clutch emulation assembly 116 to assist with the overall emulation capabilities of EV system 100. Any, or all of, steering apparatus 106, steering haptics control unit 150, or paddle shifters 152A and 152B may be configured for bilateral communication with control unit 124 based on a selected emulation profile for rendering by EV system 100.

Clutch emulation assembly 116, EV throttle apparatus 118, and EV brake apparatus 120 are each accessible through occupant compartment 104. Clutch emulation assembly 116 comprises a suitable pedal or occupant input interface for providing control unit 124 with an indication, or flag, of a clutch pedal being depressed, partially or fully. The clutch status indication, or flag, provides a message to be processed by, for example, control unit 124 in order to emulate steering, shifting, and noise feedback for perception based on rendering criteria in an emulation profile being processed using EV system 100. As shown in FIG. 1, clutch emulation camera 154 is positioned within occupant compartment 104 in order to track occupant movements that can be perceived, or processed as, clutch inputs in order to create a more immersive emulation experience based on a loaded emulation profile. For example, clutch emulation assembly 116 may lack a particular pedal assembly and an occupant of occupant compartment 104 may only provide clutch depression inputs without actually touching or depressing a mechanical clutch pedal. Clutch emulation camera 154 captures one or more of images or video of the occupant in order to have the images or frames of video processed (e.g., via control unit 124) to determine clutch depression related motions are being performed (e.g., using one or more of object detection or using a neural network to train a model to output accurate clutch depression flags).

EV throttle apparatus 118 controls one or more of front motor assembly 128 or rear motor assembly 132 in order to increase the rotational rate of one or more of front wheels 142A and 142B or rear wheels 144A and 144B. EV throttle apparatus 118 comprises a suitable pedal or occupant input interface for providing control unit 124, for example, an indication of a target throttle output by one or more of front motor assembly 128 or rear motor assembly 132. The indication of the throttle input is used by control unit 124 to generate instructions for emulating one or more elements in the active, or selected, emulation profile (e.g., corresponding to shifting or audio outputs to replicate a manual transmission response or combustion engine response based on motor outputs to road wheels). EV brake apparatus 120 comprises a suitable pedal or occupant input interface for providing control unit 124, for example, an indication of expected reduction in road wheel speeds in order to assist with control unit 124 generated updated instructions for rendering one or more elements of the active, or selected, emulation profile. The information communicated by one or more of EV throttle apparatus 118, EV throttle apparatus 118, or clutch emulation assembly 116 can, in some embodiments, affect the gauge interface rendered by OLED gauge display 108. For example, throttle inputs to EV throttle apparatus 118 may cause a generated RPM dial of OLED gauge display 108 to communicate an increase in RPMs (e.g., using a rendered dial gauge) while brake inputs to EV brake apparatus 120 may cause the RPM dial to communicate a decrease in RPMs to an occupant of occupant compartment 104. Additionally, or alternatively, clutch emulation assembly 116 can also generate data that modifies one or more elements of OLED gauge display 108. For example, clutch pedal depression paired with a current RPM status and an emulated gear pattern from the selected, or active, emulation package (e.g., as replicated by shifter accessory 112) may affect how one or more gauges of OLED gauge display 108 presents, or generates for display, one or more gauges, gear engagement indicators, or messages thereby.

As shown in FIG. 1, occupant camera 156 is arranged to capture one or more images or frames of video of an occupant of occupant compartment 104 as said occupant moves or gestures towards one or more of infotainment display 110 or shifter accessory 112. In some embodiments, one or more of infotainment display 110 or shifter accessory 112 may be used to generate for display a gear pattern from a selected, or active, emulation profile that includes a shifter pattern for emulating gear shifting by one or more components of vehicle system 100. When the shifter pattern is generated for emulation purposes, occupant camera 156 captures images or video frames of the occupant and uses one or more of edge detection, object detection, or a neural network to determine the occupant is performing a shifting motion (e.g., based on relative motion between an occupants hand and one or more of infotainment display 110 or shifter accessory 112. In some embodiments, a transmission emulation controller and a shifter feedback controller interface with shifter accessory 112 to provide a data structure comprising instructions for operating one or more actuators to generate feedback for vehicle occupant perception. Additionally, or alternatively, haptics glove 114 interfaces with its own haptic feedback controller in order to generate haptic feedback directly to a hand of the vehicle occupant in order to complete the immersive replication of the emulation profile via vehicle system 100.

The emulation packages of this disclosure can be sourced or generated by any suitable administrator, such as a vehicle manufacturer. For example, a vehicle manufacturer may produce EVs and petrol-based builds within a same vehicle line. Accordingly, the vehicle manufacturer has access to data that characterizes the EV and the petrol-based build in order to create an emulation profile (e.g., a data structure comprising rendering criteria and instructions for execution by the various components of EV system 100) for simulating (e.g., emulating) various operation parameters of the petrol-based vehicle that cause an EV occupant to the experience of operating the petrol-based vehicle while operating the EV. The characteristics to be emulated when the emulation profile is loaded to EV system 100 for rendering include one or more of a horsepower curve across the RPM range (e.g., wherein the RPM range of the EV is correlated to a RPM range of a petrol-based engine within the same vehicle line), the wheel torque curve across the RPM range, the number of gears and gear ratios for each of the gears, the gear pattern (e.g., including manual transmission gear patterns and automatic transmission gear patterns), final drive ratio, the vehicle weight, the vehicle tire size, or audio and haptic profiles for emulating engine sounds and vibration. In some embodiments, EV system 100 can improve torque curve emulation by generating instructions that cause a power inverter (e.g., a direct current to alternating current inverter) of an EV comprising EV system 100 to alter one or more of a frequency, an amplitude, or a voltage supplied to an EV motor (e.g., through a stator of the EV motor) for actuating road wheels of the EV in order to alter the torque characteristics.

These emulation profiles can be for both historical production road going vehicles and racing vehicles. Additionally, or alternatively, the emulation profile includes a series of color profiles for enabling a body of the vehicle to receive instructions for modifying the color of the body panels. Some example body panel modification technology includes black, white, shades of gray, and red. As this body panel color modification strategy and other improve to make more colors available, the emulation profiles of this disclosure includes capabilities of updating the available colors for respective emulation profiles based, for example, on original, current, or future paint code options for each respective vehicle line (e.g., including current or historical vehicle builds, vehicle lines, or color code options).

In one embodiment, the infotainment system generates for display (e.g., via infotainment display 110) a storefront to purchase vehicle profiles for emulation and can be loaded via a network connection (e.g., where control unit 124 has access to the internet and can interface with an application interface for providing selectable options for emulation profiles to a user on one or more displays of this disclosure including smart mobile device 122). In some embodiments, one or more processors, or processing circuitries, are dedicated to facilitating access to emulation profiles for an EV and an occupant thereof. An EV manufacturer may create a wide variety of EV models that, for example, vary with respect to the amount of horsepower generated across different operational conditions, drivetrain configurations and capabilities (e.g., with different road wheel actuation strategies resulting in variations of two wheel drive and four wheel drive configurations). If an EV is not capable of emulating some petrol vehicles due to lack of compatibility in terms of horsepower replication, drive train configurations, or other features describes herein, the insufficient EVs will not be presented for access by an occupant certain incompatible emulation profiles for download and attempted emulation. Emulation profile options could, for example, be utilized to advertise more capable EV builds to entice a trade in or new EV purchase. In some embodiments, the virtual store front is configured to only show vehicles that are compatible. Additionally, or alternatively, a vehicle model upgrade may be advertised as a requirement to gain access to a currently inaccessible vehicle emulation profile (e.g., where a software update enables compatibility between an EV and an emulation profile).

In one embodiment, emulation profiles are represented by images or graphical representations of the vehicles the profile provides emulation parameters for and these graphical representations are collectively kept in a virtual garage that can be presented to the user (e.g., via one or more of infotainment display 110 or smart mobile device 122). The garage can, in some embodiments, create classifications for different emulation profiles. For example, emulation profiles may be categorized as "road profiles" (e.g., for commuting or other transit related roads) and "track profiles" (e.g., for performance or racing related applications of emulation profiles). Access to road or track profiles may be filtered based on a current location (e.g., as identified through a vehicle GPS signal or device GPS signal that is readily accessible to the user such as smart mobile device 122). For example, control unit 124 may filter the displayed emulation profiles in the garages based on a current location of the vehicle such that the track profiles are inaccessible unless the vehicle is at a track venue or appropriate performance driving center.

Additionally, or alternatively, a user can select a default road or commuting emulation profile and a default race or track emulation profile. GPS can be configured to identify types of locations (e.g., residential, commercial, track, arena). When the GPS provides an identifying flag corresponding to a current vehicle location type, then portions of the virtual garage are locked or prevented from being accessible to the user through the EV interface. For example, when the EV is at a track or race event, all emulation profiles may be accessible. If the track or race event has certain criteria (e.g., horsepower limits, noise limits, other performance criteria limits), only the emulation profiles that meet the criteria of the event are available. Similar filtering may occur based on ordinances or other criteria tied to particular locations (e.g., noise limits, speed limits, bans on certain vehicle configurations or modifications).

In one embodiment, EV system 100 is configured to disable the activated, or selected, emulation profile and return to a standard operational mode when a vehicle occupant is operating the EV in a manner indicative of lack of control of EV system 100 with the emulation profile activated. For example, one or more vehicle sensors may detect one or more of lack of wheel traction, abrupt or rapid turning, overall EV tipping or twisting, or generate lack of decisive use of steering apparatus 106. EV systems, including EV system 100, include warnings and other safety override features to assist with preventing a crash despite inputs leading to sporadic vehicle operation. EV system 100 is configured for "safety emulation override" where the core systems of vehicle operation prevent modification of EV system 100 performance based on emulation profile rendering criteria and revert EV system 100 to a road safe production based compliant EV operational state inclusive of all active safety functions (e.g., including autopilot functions for forcing an uncontrolled driver to pull over or traction control where too much wheel slip is detected within a predefined period). As an example, performance or track vehicles that are known as requiring experienced handling when pushing the physical limits of the vehicle build have been labelled as "widow makers" in that inappropriate, or inexperienced, operation of these vehicles led to devastating vehicle crashes (e.g., due to sharp turns being navigated without appropriate speed, grips, or angles by inexperienced drivers and unique operation parameters including unique torque curves).

When in emulation mode with a selected emulation profile providing active rendering instructions throughout EV system 100 and EV system is being used to traverse a public road, the system will perform a safety emulation override when the system detects the vehicle is losing control. This safety emulation override may engage due to an anticipated accident. In some circumstances, an experienced driver may be leveraging the emulated car's characteristics to their advantage (e.g., where the experienced driver understands how to safety operate the EV based on the emulated performance characteristics). Accordingly, certain embodiments of this disclosure include an option to disable this safety emulation override feature for those experienced drivers that are familiar with the handling characteristics of the vehicle (e.g., specifically when these experienced drivers are at a track or race event). This safety override may, in some embodiments, be controlled by the location of the vehicle. Additionally, or alternatively, an event coordinator or track supervisor may be provided an overall control means to control the ability to override the safety override feature at the event.

Figure 2:
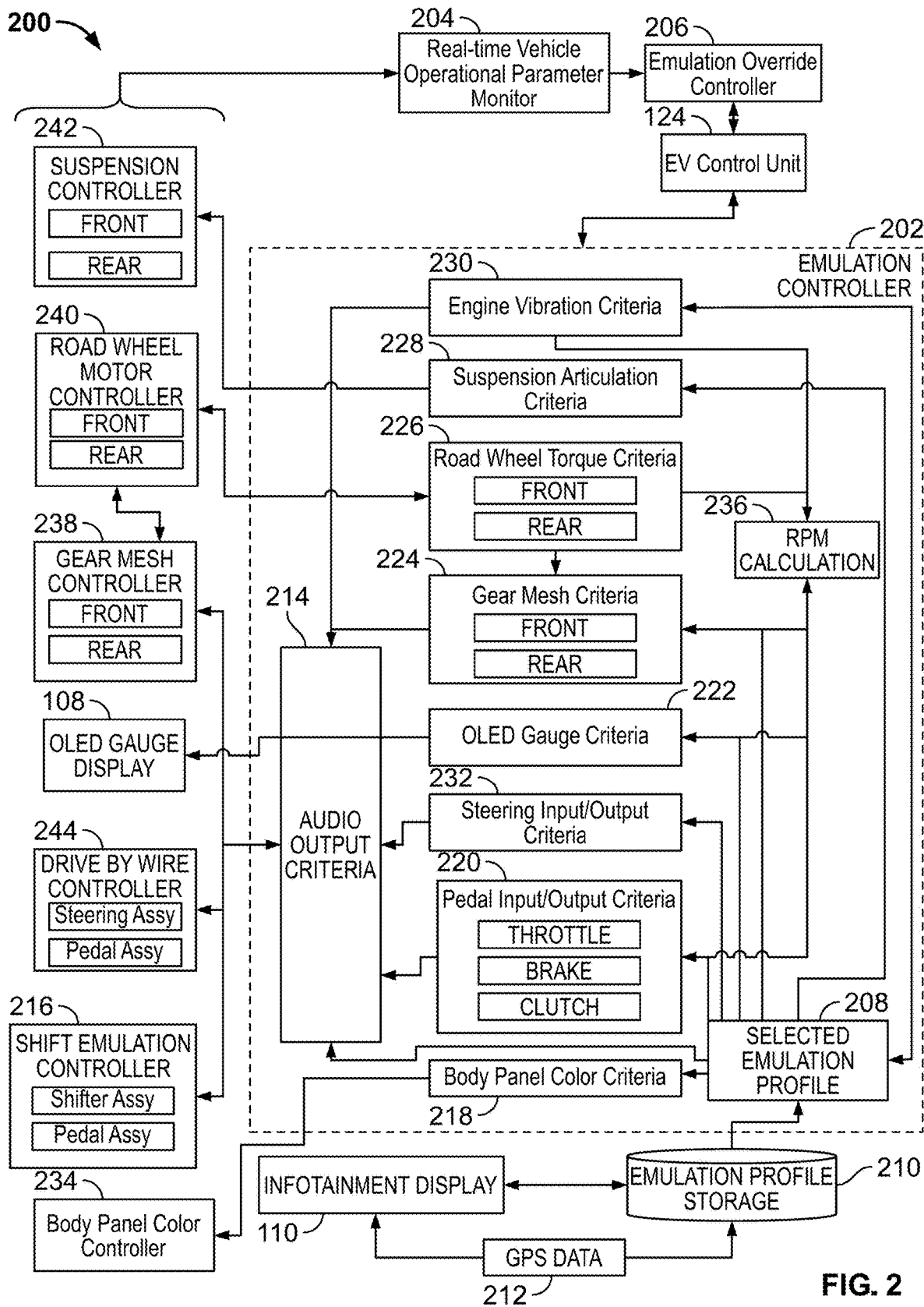
FIG. 2 is a block diagram of an EV system for emulating a petrol-based vehicle assembly based on an emulation package, in accordance with some embodiments of the disclosure.

FIG. 2 is a block diagram of EV system 200 for emulating a petrol-based vehicle assembly based on an emulation package, in accordance with some embodiments of the disclosure. EV system 200 may incorporate, or be incorporated into, each of the embodiments depicted in FIGS. 1, 3, and 4. Additionally, or alternatively, EV system 200 comprises one or more control units, processors, control circuitry, or processing circuitry configured to execute computer readable instructions, provided through transmission or processing of a non-transitory computer readable medium for, that provide protocols for performing one or more elements of any of the processes of FIGS. 5-12.

EV system 200 provides an example of a system architecture that provides emulation rendering criteria and instructions to an EV based on a selected emulation profile. EV system 200 incorporates process blocks, controllers, and control units that may, in some embodiments, enable EV system 100 to render an emulation profile for vehicle occupant perception. EV system 200 comprises EV control unit 124 of FIG. 1, which interfaces with emulation controller 202 of FIG. 2 and relies on inputs from real-time vehicle operational parameter monitor 204 and emulation override controller 206 to provide updated information to emulation control 202 during rendering of selected emulation profile 208. Selected emulation profile 208 is a data structure accessible through emulation profile storage 210. Emulation profile storage 210 is any suitable data store or server communicatively accessible to EV system 200 through one or more of infotainment display 110 of FIG. 1 or emulation control unit 124. Emulation profile storage 210 compiles available petrol-based vehicle emulation profiles based on one or more build parameters associated with an EV comprising EV system 200. As shown in FIG. 2, GPS data 212 is available to one or more of infotainment display 110, emulation storage profile 210, or control unit 124 based on one or more of GPS data from a mobile device (e.g., a smart phone) communicatively accessible by EV system 200 (e.g., as shown in FIG. 1) or a GPS tracker incorporated into EV system 200.

EV system 200 incorporates the use of GPS data 212 for a few reasons to assist with processing of selected emulation profile 208, or processing generation of interfaces that communicate available emulation profiles through emulation profile storage 210. For example, if EV system 200 is used for a road trip that cross multiple state borders or municipality defining borders, then the operational regulations that EV system 200 is subjected to may change based on local rules or ordinances. In some embodiments, audio output criteria 214 can be filtered, updated, or restricted based on operational regulations correlated to a current location of EV system 200. The operational regulations may be readily apparent based on informational flags associated or packaged with GPS data in certain locations. Additionally, or alternatively, EV control unit 124 may be prompted by emulation controller 202 to identify specifics associated with location based operational parameters in order to generated updated emulation rendering criteria for specific nodes throughout EV system 200. One example of an operational regulation is sound regulations to avoid certain types or levels of noise pollution. Accordingly, audio output criteria 214 may be updated based on the GPS data by emulation control 202 to include one or more instructive data packets causing audio output devices of EV system 200 to reduce a decibel output level, reduce a volume level, or prevent generation of certain audible frequencies. Where data is available and accessible to EV system 200, this reduction or modification of audio outputs as communicated by audio output criteria 214 can also be applied when entering certain housing subdivisions or when travelling around certain cities (e.g., based on local data updates or data provided by a vehicle occupant through one or more devices communicatively coupled to EV system 200).

In some embodiments, EV system 200 incorporates instructions to adjust one or more emulation profile rendering criteria based on a current time of day. The time of day may, for example, be provided through data or settings corresponding to infotainment display 110 or some other smart device communicatively coupled to or integrated into EV system 200. There may be some recognized quiet times with restrictions on noise levels or certain frequencies of sound generated. When a vehicle comprising EV system 200 enters a certain area (e.g., a neighborhood or housing subdivision) within a timeframe characterized by restrictions, then one or more elements of audio output criteria 214 may be modified to either reduce a magnitude of sound to be generated, reduce a complexity of sound to be generated, or eliminate generation of all sound based on emulation profile rendering criteria defined in selected emulation profile 208. In some embodiments, EV system 200 may be configured to switch to in cabin audio only (e.g., audio output devices 146A of FIG. 1) and either disable or lower external audio volume (e.g., tubed audio output devices 146B of FIG. 1).

GPS data 212 may also be used, in some embodiments, to assist to identify whether EV system 200 is entering an area with high pedestrian traffic. EV control unit 124 can be configured to have an emulation mode and a "standard operation" mode. Emulation mode enables EV system 200 to access one or more elements of selected emulation profile 208 to generating rendering criteria as transmittable instructions for execution by any of the elements of EV system 200. Standard operation mode corresponds to EV system 200 operating an EV without most or all of selected emulation profile 208 being active. In some embodiments, EV control unit 124 can be configured to activate audio output criteria 214 to provide audio of a "default" petrol-based vehicle in order to alert surrounding traffic, pedestrian or otherwise, of the presence of EV system 200. This audio output may be generated whether EV system 200 is in emulation mode or standard operation mode (e.g., without rendering all or most elements of selected emulation profile 208).

Since EV system 200 can access GPS data 212 and related information (e.g., operational regulations corresponding to certain GPS locations), certain emulation profiles, or elements thereof, may only be selected in select areas such as off-road race events, or any suitable version of a race or track related event where on-road operational restrictions are not applicable. In some embodiments, EV control unit or emulation controller 202 may activate geofencing to limit or provide access to certain emulation profile aspects (e.g., as defined by data structures compiled in the stored emulation profiles of emulation profile storage 210). Geofencing, in this disclosure, involves modifying elements of selected or available emulation profiles based on current location data and regulations accessible about the current location of EV system 200. In some embodiments, geofencing may restrict a vehicle comprised of EV system 200 to a non-emulation mode, or standard operation mode. For example, standard operation mode may be required for certain parking structures or EV charging stations.

In some embodiments, at least infotainment display 110 incorporates lockout settings so only a primary operator or owner of EV system 200 can access the full range of emulation profiles stored in or accessible by the emulation profile garage (e.g., as available through emulation profile storage 210). As with certain existing application interfaces, other users may be added to a list of EV users who have access to the emulation profiles of the garage. Some of these users may have a subset of emulation profiles accessible based on administrative style settings that the EV owner has access to. In some embodiments, EV control unit 124 includes operational settings for a guest or valet driving mode which can either be configured to lock out all emulation profiles from the guest or valet or can limit the emulation profiles accessed to a default emulation profile. For example, the default setting may be an adequately noisy emulation profile without the performance level torque outputs which could affect handling of EV system 200. Accordingly, the guest or valet driver is limited to operational abilities that do not require an expert or experienced driver for safe operation. In some embodiments, the guest or valet mode can be configured to disable manual transmission emulation, despite the manual transmission data structure being available for emulation by, for example, shift emulation controller 216 (e.g., which interfaces a shifter accessory assembly and a clutch pedal assembly or clutch engagement flag generating apparatus). By disabling this portion of the emulation profile, guests operating the vehicle in guest or valet mode are able to operate EV system 200 without having to learn additional operational criteria.

In some embodiments, EV system 200 is configured to differentiate between driver profiles. For example, an EV comprising EV system 200 may be utilized by multiple drivers (e.g., two parents and a child). A first parent can be considered a system administrator who has access to a virtual garage with multiple emulation profiles. The second parent can be considered an alternate administrator with reduced virtual garage access. The child can be considered a guest user of EV system 200 and, depending on settings established by the first parent or system administrator, may not have access to any emulation profiles. Each of these drivers may be identified based on one or more of biometric authentication or device profile recognition of a personal mobile smart device (e.g., a smart phone or a smart watch). In some embodiments, each of these multiple drivers can be provided a digital car key for access to EV system 200 in order to enter the EV comprising EV system 200 and operate the EV. Each of these digital car keys can include modifiable settings for access to emulation modes of the EV and EV system 200. For example, when the first parent is recognized as a vehicle occupant or vehicle operator, complete access to a virtual garage for selecting and activating one or more emulation profiles can be facilitated whereas when the child is recognized as the vehicle occupant or vehicle operator, emulation mode can be restricted or be prevented from being activated based on access protocols defined by the digital car key.

In some embodiments, a navigation path (e.g., user is going from home to work) is displayed on the car's infotainment system or is displayed via a map or navigation application on a mobile device. The navigation path (e.g., as defined at least in part by GPS data 212) may provide one or more audio output generation criteria elements such that audio output criteria 214 is configured based on a combination of one or more of the navigation path (e.g., as defined by GPS data 212 and related accessible supplemental data), previous occupant actions relative to interfaces of EV system 200, system or profile setting as recognized by EV control unit 124, current or predicted weather conditions, or current or predicted traffic condition for the duration of a trip defined at least in part by the navigation path. In some embodiments, selected emulation profile 208 may be modified or switched out based on a destination corresponding the provided or generated navigation path. Additionally, or alternative a number of occupants of a vehicle (e.g., based on data from one or more sensors that characterize motion and occupation of occupant compartment 104 of FIG. 1) comprising one or more of EV system 100 of FIG. 1 or EV system 200 of FIG. 2 may be considered by EV control unit 124 in terms of which elements of selected emulation profile 208 (e.g., corresponding to audio output criteria 214) are to be used for generating rendering criteria for one or more components of the systems of this disclosure.

In some embodiments, one or more of selected emulation profile 208, GPS data 212, or a navigation path includes metadata to assist with a recommendation for a default or active emulation profile, or selection of an available emulation profile. Metadata can include, for example, details or context of a navigation path (e.g., one or more of road trip, family ride, sunny day, highway traversal). Different vehicle emulation profiles may be highlighted or recommended for selection based travel conditions corresponding to a current location, navigation path, or predicated routine for using EV system 200. For example, heavy rain may cause EV control unit 124 to switch to an emulation profile or normal operation mode that lacks a risk of wheel slippage given the conditions (e.g., reducing road wheel torque outputs to ensure a higher probability of road wheel grip).

In one embodiment, vehicles can automatically switch a sound profile to match that of another nearby vehicle (e.g., a vehicle in nearby lane) by capturing an audio portion of the sound profile, identifying the profile, and automatically activating such profile if available. The sound profile can be part of an overall vehicle emulation profile or can be a separate sound profile that only requires instructions for generating audio outputs. Additionally, or alternatively, the selection of a profile or automatic switching from one profile to another is based on other activities by the vehicle. For example, infotainment display 110 may be configured to generate notifications of an incoming video or audio call, or might detect that one or more screens in the vehicle are consuming content (e.g., streaming) and therefore alter the operation of the profile or switch to another profile in order to ensure a vehicle occupant is able to handle the outputs of the active emulation profile without risk of losing control of a vehicle comprising EV system 200 or without creating noise that violated regulations or ordinances corresponding to a current location of the vehicle.

In another embodiment, different vehicle emulation profiles can be one or more of activated or presented for selection for activation based on current travel conditions (e.g., weather conditions along a route or navigation path. For example, heavy rain or snow can affect quality of handling of an EV, whether in an emulation mode or a normal operating mode. Responsive to detection of adverse driving conditions (e.g., heavy rain or snow that is impacting road wheel traction of the EV resulting in road wheel slippage), EV system 200 can be configured to switch to a default vehicle based on the detected condition. Typically, a four wheel drive mode can be used to improve handling when traversing a route with adverse weather conditions. Accordingly, EV system 200 can be configured to automatically activate a four wheel drive emulation profile that is acceptable to use on public streets. Current travel conditions can also correspond to entering heavy traffic or streets with frequent stops (e.g., within a densely populated are or a city). EV system 200 can also be configured to automatically activate an emulation profile that offers more efficient performance at lower EV engine RPMs, as opposed to higher EV engine RPMs, in order to enable a more efficient operation mode for the EV comprising EV system 200. Additionally, or alternatively, certain automatic transmission emulation profiles can be considered easier to utilized in these high density traffic scenarios with a high frequency of stops. Where the EV comprising EV system 200 enters these high density traffic scenarios, EV system 200 can be configured to automatically activate an automatic transmission emulation profile to ease the EV operators mind in terms of operation elements to keep track of while scanning the high density traffic environment.

In some embodiments, selected emulation profile 208 includes rendering criteria for emulating a manual transmission which includes emulation shifting of a shifter assembly. Shift emulation using EV system 200, or EV system 100 of FIG. 1, may be achievable through an application on a smart mobile device with vehicle occupant motion tracking capabilities or vehicle occupant input receiving capabilities (e.g., where smart mobile device 122 is a personal phone with a touch screen configured to visual recognition of objects and motions through a camera style sensor). The smart mobile device may enable this vehicle occupant monitoring while an emulation application is active (e.g., running such that the smart mobile device is a conduit of transmitted data and instructions between the vehicle occupant and EV control unit 124. When the mobile emulation application is processing inputs for generating instructions to EV control unit 124 and emulation controller 202 (e.g., based on a connection such as Bluetooth or WIFI), the device may generate for display a gear shifter pattern and may convert user inputs to shifter emulation instructions for processing by shift emulation controller 216. For example, the device may comprise inertial measurement unit sensors ("IMUs") such that the shift pattern is defined by whether the occupant is holding the device in a right or left hand (e.g., modifying where a shifter lever may be positioned and how the gear pattern lays out), whether the vehicle comprising EV system 200 includes right or left handed operational components, or whether the user moves the device or their hand for manipulating an emulated shifter lever and knob assembly through a displayed gear pattern. In some embodiments, the gear pattern is displayed on the mobile device and the shifter assembly of the gear pattern moves through the gear pattern based on movement of the device itself, thereby updating the displayed gear pattern based on a current shift executed by occupant hand motions. In some embodiments, the EV manufacturer may offer an optional add-on to mount a gear shift and clutch into the EV (e.g., as represented by clutch assembly 116 or shifter accessory 112 of FIG. 1). Additionally, or alternatively, voice commands can be employed for emulating EV level responses to emulated shifter manipulation based on current vehicle operational parameters (e.g., RPM calculations). Natural language processing may be executed based on voice inputs received by one or more microphones within occupant compartment 104. Based on the instructed shift, haptic feedback may be generated by one or more elements of EV system 200 or EV system 100 to provide an immersive emulation of shifting in an EV without a transmission configured for manual shifting.

As shown in FIG. 2, selected emulation profile 208 includes a number of information nodes or processing blocks that provide rendering criteria to a plurality of EV system processing nodes, or modules. Selected emulation profile 208 includes at least body panel color criteria 218, pedal input/output criteria 220, OLED gauge criteria 222, gear mesh criteria 224, road wheel torque criteria 226, suspension articulation criteria 228, steering input/output criteria 232, and engine vibration criteria 230. Any or all of these may be processed for generating instructions through emulation controller 202 as enabled by EV control unit 124 in order to cause one or more vehicle processing nodes or modules to generate a vehicle emulation output (e.g., one or more of a visible output, an audio output, an actuator response output, or haptic output).

Body panel color criteria 218 is a portion of selected emulation profile 208 that enables an operator of EV system 200 to select one or more body panel colors to render by body panel color controller 234. Body panel color controller 234 is processing circuitry that converts color rendering criteria into an output to be displayed by body panels of a vehicle comprising EV system 200. Pedal input/output criteria 220 includes throttle, brake, and available clutch pedal responsiveness data as defined by selected emulation profile 208 to assisting with generating audio output criteria 214. Additionally, pedal input/output criteria 220 serves as a conduit for transmitting data from an example pedal assembly to RPM calculation processing block 236, as well as responding to the current RPM calculated value, in order to align the output audio with the operational metrics of a vehicle comprising EV system 200 that is attempting to emulate a vehicle based on selected emulation profile 208. OLED gauge criteria 222 provides rendering criteria including a number and type of gauges to be displayed via OLED gauge display 108 and also receives updated based on outputs from RPM calculation processing block 236. Gear mesh criteria 224 represents covered transmission and gear engagement data from selected emulation profile 208 as applicable to gear mesh controller 238, which actuates gears for engaging front or rear road wheel assemblies with front or rear transmission assemblies as powered by road wheel motor controlled through road wheel motor controller 240.

As shown in FIG. 2, road wheel motor controller 240 has a bilateral communication loop with gear mesh controller 238 and road wheel torque criteria 226 in order to maintain an ever updating data stream with RPM calculation processing block 236 for providing an actively updating and responsive emulation experience through EV system 200. Suspension articulation criteria 228 provides operational characteristics to emulate road handling responses of a vehicle comprising EV system 200. The operational characteristics are shown in FIG. 2 as being provided to suspension controller 242, which can be used to control articulation of one or more of front corner suspension apparatuses 136A and 136B of FIG. 1, or rear corner suspension apparatuses 138A and 138B of FIG. 1 in order to improve emulation of the road handling responsiveness of an EV comprising EV system 200 (e.g., by adjusting solenoid-sourced, electrically sourced, or mechanically sourced replicated damping, spring rates, or joint articulation ranges). Additionally, drive by wire controller 244 is shown receiving steering input/output criteria (e.g., during or after processing by emulation controller 202 for generating audio output criteria 214) to cause EV system 200 to be able to override the rendering of elements of the emulation profile to avoid crashes during unsafe operation (e.g., based on processing of operational data by real-time vehicle operational parameter monitor which provides indications, or flags, that cause emulation override controller 206 to end the current emulation session based on selected emulation profile 208).

RPM calculation processing block 236 provides a means for enabling nuances of petrol-based vehicle emulation using, for example, EV system 200 based on selected emulation profile 208. The RPM calculations performed through emulation controller 202 (e.g., via RPM calculation processing block 236) includes formulas to relate measurable road wheel torque (e.g., as available through road wheel motor controller 240) to engine torque, which can be corresponding to road wheel motor torque based on an architecture of a particular EV. For example, road wheel torque can be a calculated function of engine torque (e.g., where engine torque represents torque of a petrol-based engine) if provided parameters and current operation status of a gear mesh (e.g., a transmission gear engagement status defined by which gears are engaged) are known. For example, a road wheel torque and a corresponding force can be computed based on a current engine torque, gear ratio (e.g., of engaged gears in one or more transmissions of this disclosure), a final drive ratio (e.g., as defined by a differential that engages various elements of the transmissions and output gears that enable road wheel motor of vehicles of this disclosure), and a static wheel radius (e.g., based on a vehicle with the wheel being unloaded and the wheel is not rotating for generating motion). The below formula is applicable to any powertrain architecture (e.g., front wheel, rear wheel, or all-wheel drive) that can be replicated in an EV assembly. This method can be applied to any powertrain architecture (front-wheel drive or rear-wheel drive)

RPM calculation processing block 236 may utilize, in some embodiments, the below formula for generating at least one calculated RPM per processing loop of EV system 200:

$$F_w = i_x \cdot i_0 \cdot T_e \quad (1)$$

In formula (1), $F_w$ corresponds to the force to be generated at a particular vehicle road wheel. $T_e$ represents an engine torque of a vehicle to be emulated whereas $i_o$ represents an engaged gear ratio and $i_x$ represents a final drive ratio. Vehicle build data, when paired with formula (1), enables realistic conversion of operational parameters between the vehicle to be emulated and the emulation capabilities of the EV comprising EV system 200 to enable preferred EV acceleration and power curve emulation.

To relate the target $F_w$ from formula (1), a curb weight of the emulation profile may be used for determining adjusting the power to weight ratio for the proper simulation considering the difference in the emulated vehicle weight and the EV performing the emulation. The wheel torque can be computed based on the previous data of engine torque, gear ratios and final drive ratio using the below formula:

$$\text{Required } EV\ T_w = T_e \cdot gk \cdot G \cdot (EV_w/Vem_w) \quad (2)$$

In formula (2), the required EV wheel torque ("Required EV Tw") is based on a product of engine torque ("$T_e$"), gear ratio for a currently engaged gear ("gk"), final drive ratio ("G"), and the ratio ("$EV_w/Vem_w$") of the EV vehicle weight to the real world weight of the vehicle to be emulated through the EV via EV system 200. The gear ratio in formula (2) is the ratio of the number of teeth on the ring gear to the number of teeth on the pinon gear in a differential.

While the value computed using formula (2) is useful for creating direct road wheel motor output instructions, the engine RPM can be calculated based on the below formula:

$$\text{Engine } RPM = (\text{speed} \cdot gk \cdot 336)/(\text{Tire Diameter} \cdot G) \quad (3)$$

The speed of formula (3) is the EV speed in miles per hour, and "gk" corresponds to a gear ratio for the currently engaged gear. The number "336" is a constant that converts miles per hour to rotations per mile based on a number of revolutions of a tire of the EV per mile. "Tire Diameter" is the diameter of the EV tire in inches and "G" represented the final drive gear ratio. Additionally, or alternatively, the emulated engine RPM can also be calculated using the formula below:

$$\text{Engine } RPM = (\text{speed} \cdot gk \cdot G \cdot 1000)/(\text{Tire Diameter} \cdot \pi) \quad (4)$$

The speed of formula (4) is speed in kilometers per hour. The variables "gk" and "G" are the same as in formula (3). The number 1000 correlates the number of meters in a kilometer and "Tire Diameter" in formula (4) is the EV tire diameter in meters. Each of these formulas in combination with the various controllers and processing circuitries of this disclosure provide a formula based approach to determining a magnitude and timing of haptic feedback throughout EV system 200 based on an expected vehicle response to a shift attempt.

Figure 3A:
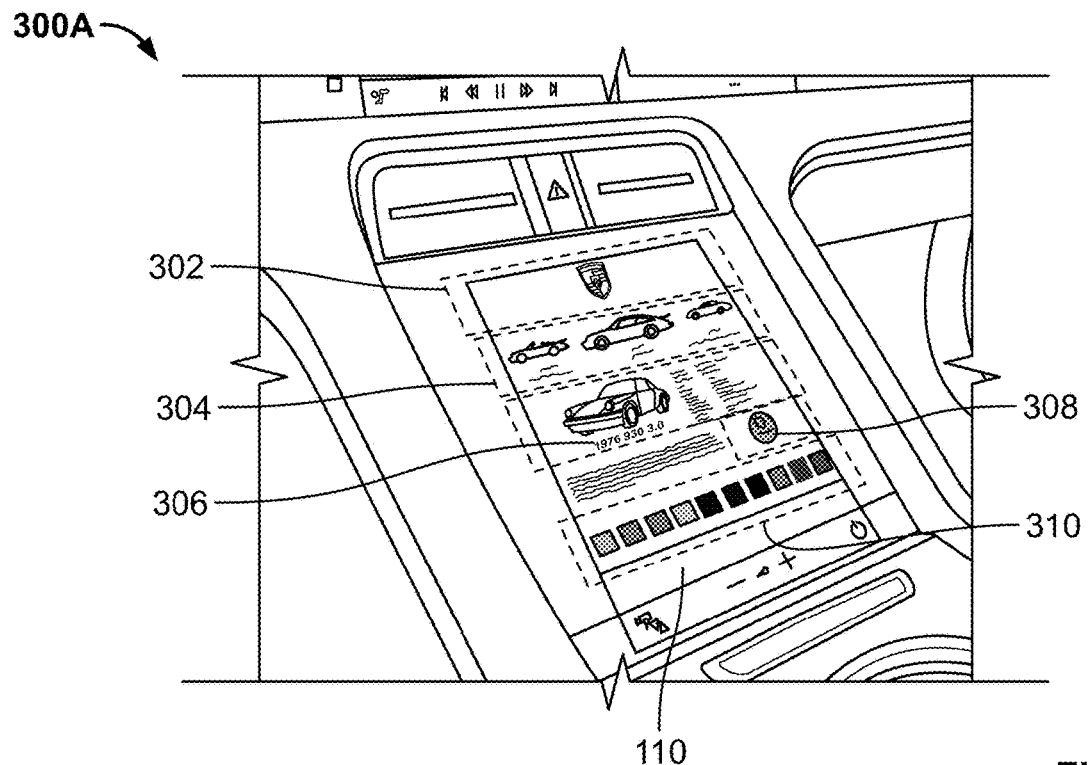
FIG. 3A depicts a vehicle display with an interactive interface for selecting an emulation profile, in accordance with some embodiments of the disclosure.

FIG. 3A depicts interactive interface 300A for selecting an emulation profile using infotainment display 110 of FIG. 1, in accordance with some embodiments of the disclosure. Interactive interface 300A may be generated by EV system 100 of FIG. 1 or EV system 200 of FIG. 2. Interactive interface 300A may be incorporated into, in whole or in part, interactive interface 300B of FIG. 3B or interactive interface 400 of FIG. 4. Additionally, or alternative, any or all of the elements of the methods of FIGS. 5-12 may cause interactive interface 300A to be generated for display.

Interactive interface 300A includes emulation store label 302, scrollable emulation profile list 304, emulation profile preview 306, purchase icon 308, and body panel color rendering options 310. Emulation store label 302 identifies one or more of a location or vehicle manufacturer that is considered a source of each of the emulation profiles in scrollable emulation profile list 304. For example, different dealerships in different locations that each provide vehicles for a same manufacturer may have different emulation profile options available (e.g., where some have historical build emulation profiles and some only have current or recent model year emulation profiles). Scrollable emulation profile list 304 may, for example, by modified by one or more of geofencing or a detected vehicle occupant input (e.g., corresponding to a hand motion) and comprises a series of graphical representations of vehicles that may be emulated by a purchased EV that is configured to generate interactive interface 300A. Emulation profile preview 306 includes a graphical representation of the real world vehicle which is represented by the selected emulation profile as well as build specifications (e.g., speed ratings, engine type, engine outputs, engine metrics, and other related characteristics that can reasonably be emulated by the EV systems of this disclosure). Additionally, emulation profile preview 306 includes a written description of the vehicle to be characterized by the emulation profile selected for preview which may incorporate a brief description of the build history, the target performance metrics, and other factual recitations that may entice an EV occupant to utilize the previewed emulation profile. Purchase icon 308 provides an in application purchase option for the EV owner. Body panel color rendering options 310 is generated as a scrollable list based on which emulation profile is being previewed from scrollable emulation profile list 304.

An EV configured to generate interactive interface 300A may, in some embodiments, be built based on a standard or optional paint code provided for construction of the EV. Paint codes can be offered based on one or more of a vehicle make or a vehicle model year. Accordingly, body panel color rendering options 310 may sort body panel color emulation options based on what paint code is currently implemented on the EV that would render a selected emulation profile. Body panel color rendering options 310 may be sorted based on similarity to the current EV vehicle configuration or based on the capability of the EV to modify its body panels to align with one or more paint codes shown in body panel color rendering options 310. In some embodiments, one or more paint code options (e.g., race specific options) may not be made available based on geofencing described in reference to this disclosure.

Figure 3B:
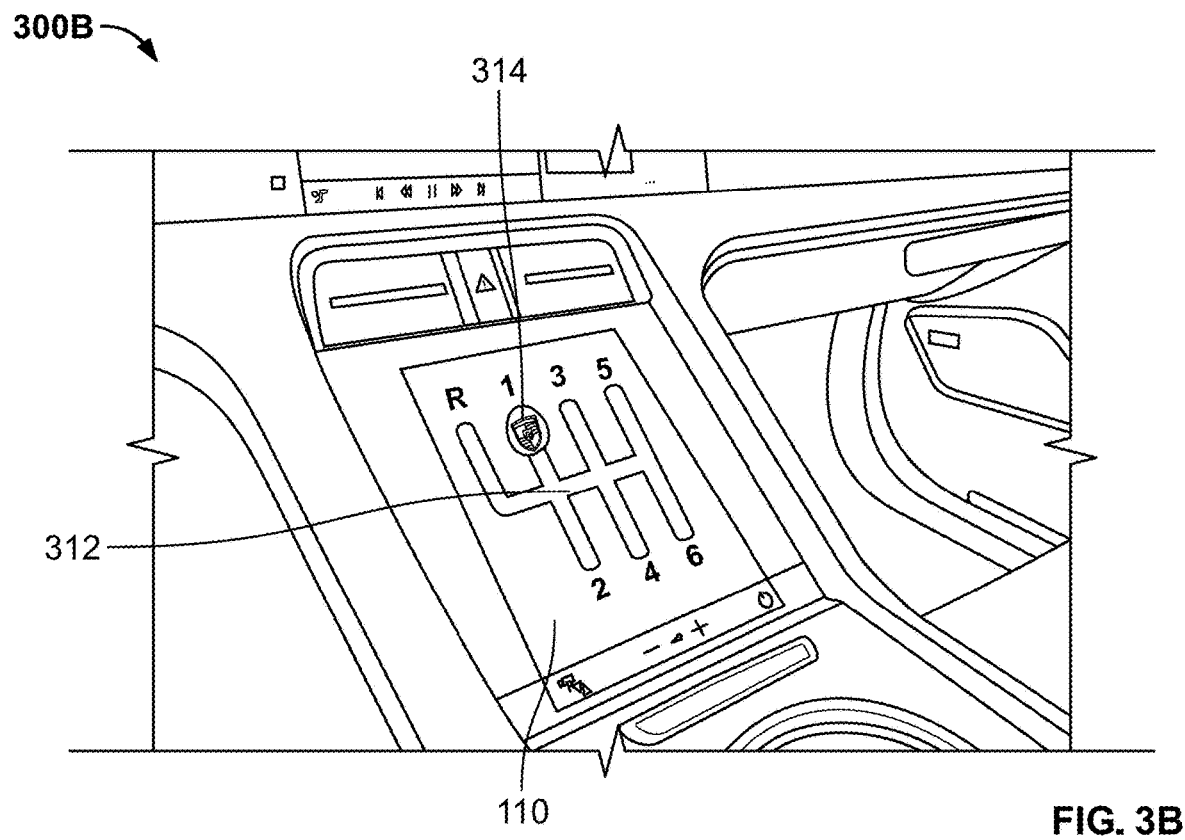
FIG. 3B depicts a vehicle display with an interactive interface for emulation of manual shifting in an EV, in accordance with some embodiments of the disclosure.

FIG. 3B depicts interactive interface 300B for emulation of manual shifting in an EV using infotainment display 110 of FIG. 1, in accordance with some embodiments of the disclosure. Interactive interface 300B may be generated by EV system 100 of FIG. 1 or EV system 200 of FIG. 2. Interactive interface 300B may be incorporated into, in whole or in part, interactive interface 300A of FIG. 3A or interactive interface 400 of FIG. 4. Additionally, or alternative, any or all of the elements of the methods of FIGS. 5-12 may cause interactive interface 300B to be generated for display.

Interactive interface 300B depicts gear pattern 312 along which shifter knob emulated position 314, based on a selected emulation profile, a current EV operation state as well as input provided by a vehicle occupant. For example, gear pattern 312 is shown as a six speed manual transmission gear pattern with one reverse gear slot. Gear pattern 312 may be any suitable gear pattern based on a selected emulation pattern (e.g., one or more of four speed manual, five speed manual, automatic transmission, or variants thereof). Shifter knob emulated position 314 indicates first gear is current engaged. Shifter knob emulated position 314 and gear pattern 312 are shown as displayed via infotainment display 110 of FIG. 1. In some embodiments, both can be generated for display via smart mobile device 122 of FIG. 1 in addition to or as an alternative to displayed in infotainment display 110. A vehicle occupant interacts with the shifter knob and the gear pattern based on one or more of touching a screen, performing a shifter motion (e.g., as captured and processed based on one or more of the cameras or sensors of this disclosure) or providing voice commands to be processed by natural language processing for parsing and generating a display modification instruction corresponding to the provided voice command.

Figure 4:
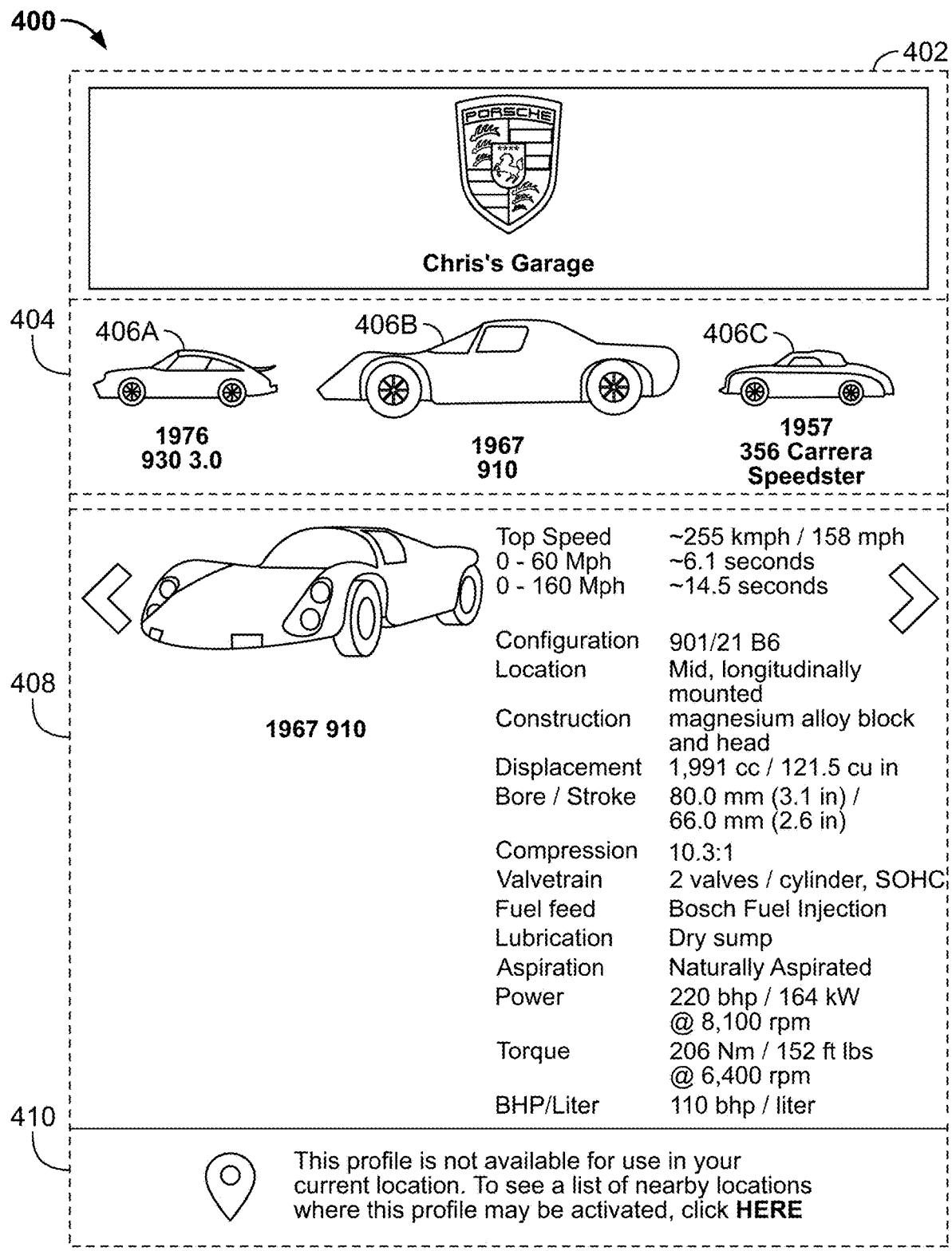
FIG. 4 depicts an interactive interface including graphic representations of emulation profiles that are generated for interaction, in accordance with some embodiments of the disclosure.

FIG. 4 depicts interactive interface 400 including graphic representations of emulation profiles that are generated for interaction (e.g., via using infotainment display 110 of FIG. 1), in accordance with some embodiments of the disclosure. Interactive interface 400 may be generated by EV system 100 of FIG. 1 or EV system 200 of FIG. 2. Interactive interface 400 may be incorporated into, in whole or in part, interactive interface 300A of FIG. 3A or interactive interface 300B of FIG. 3B. Additionally, or alternative, any or all of the elements of the methods of FIGS. 5-12 may cause interactive interface 400 to be generated for display.

Interactive interface 400 represents how an EV owner's emulation profile garage can be presented, or generated, for display using one or more displays of this disclosure (e.g., infotainment display 110 or smart mobile device 122 of FIG. 1). Interactive interface 400 is a display including selectable options for available emulation profiles that are selectable for rendering via one or more of EV system 100 of FIG. 1 or EV system 200 of FIG. 2. Arranged towards a top of interactive interface 400 is a graphic banner that includes a vehicle manufacturer logo (e.g., the logo of Porsche) and a "garage" label (e.g., "Chris's Garage"). The logo corresponds to a manufacturer of an EV build that is configured to generate for display interactive interface 400 and also identifies which manufacturer's emulation profiles are accessible through interactive interface 400. In some embodiments, the manufacturer logo can be updated and changed (e.g., based on a vehicle occupant's or application profile owner's preference) or added to (e.g., including multiple other manufacturers' logos), based on whether an application that generates interactive interface 400 is configured to provide access to multiple manufacturers with multiple emulation profiles for use in multiple EVs (e.g., where the EV owner is using a single application for storing multiple emulation profile garages for multiple vehicles that the EV owner has access to).

Interactive interface 400 also includes scrollable profile listing 404 that responds to one or more scrolling inputs in order to switch between the listed emulation profiles. For example, a scroll input can either modify the centrally oriented emulation profile 406B to be switched with emulation profiles 406A or 406C, depending on a direction of the scrolling input. In some embodiments, any or all of emulation profiles 406A-406C, and any not shown in FIG. 4 that are accessible through interactive interface 400, can be selected by one or more of a press, icon click, or voice command. Each of emulation profiles 406A-406C include a visible graphical representation of the petrol-based vehicle to be emulated through the EV configured to generate interactive interface 400 and a text-based label that provides a model year and a particular model label of the vehicle to be emulated.

Emulation profile 406B, being centrally oriented, results in the generation of emulation profile detailed description 408. Emulation profile detailed description 408 includes a 3D graphical representation of the vehicle characterized by the data structure the forms emulation profile 406B. In some embodiments, this 3D graphical presentation can be configured to automatically rotate (e.g., like in a vehicle shown room) or can be manually rotated by a user input to interactive interface 400. Emulation profile detailed description 408 includes the model year and the model of the vehicle to be emulated and also includes a list of relevant operation parameters and peak performance metrics that an EV vehicle occupant can be expected to experience when emulation profile 406B is selected for rendering. In some embodiments, selectable, or interactive, arrows are presented on either side of emulation profile detailed description 408 to enable a vehicle occupant to scroll between other emulation profiles available through the virtual garage (e.g., include emulation profile 406A or emulation profile 406C).

Arranged below emulation profile detailed description 408 is garage notification banner 410. Garage notification banner 410 includes context related to one or more of the emulation profiles available through scrollable profile listing 404. As shown in the example interface of FIG. 4, the current selected vehicle emulation profile (e.g., emulation profile 406B) has limitations regarding access based on a current location of an EV system generating interactive interface 400 for display. As described herein, different emulation profiles can be restricted from activation based on geofencing protocols assigned to different emulation profiles. As emulation profile 406B represents a performance vehicle that results in an emulation profile that may be unsuitable for most commuter roads, garage notification banner 410 includes a selectable option to provide a list of closest locations where this emulation profile can be activated without risk to the EV operator or other vehicles. The nearby locations can, for example, be racetracks or on road events where the road is closed to the public for a particular event (e.g., the "Pikes Peak Run" in Colorado).

Figure 5:
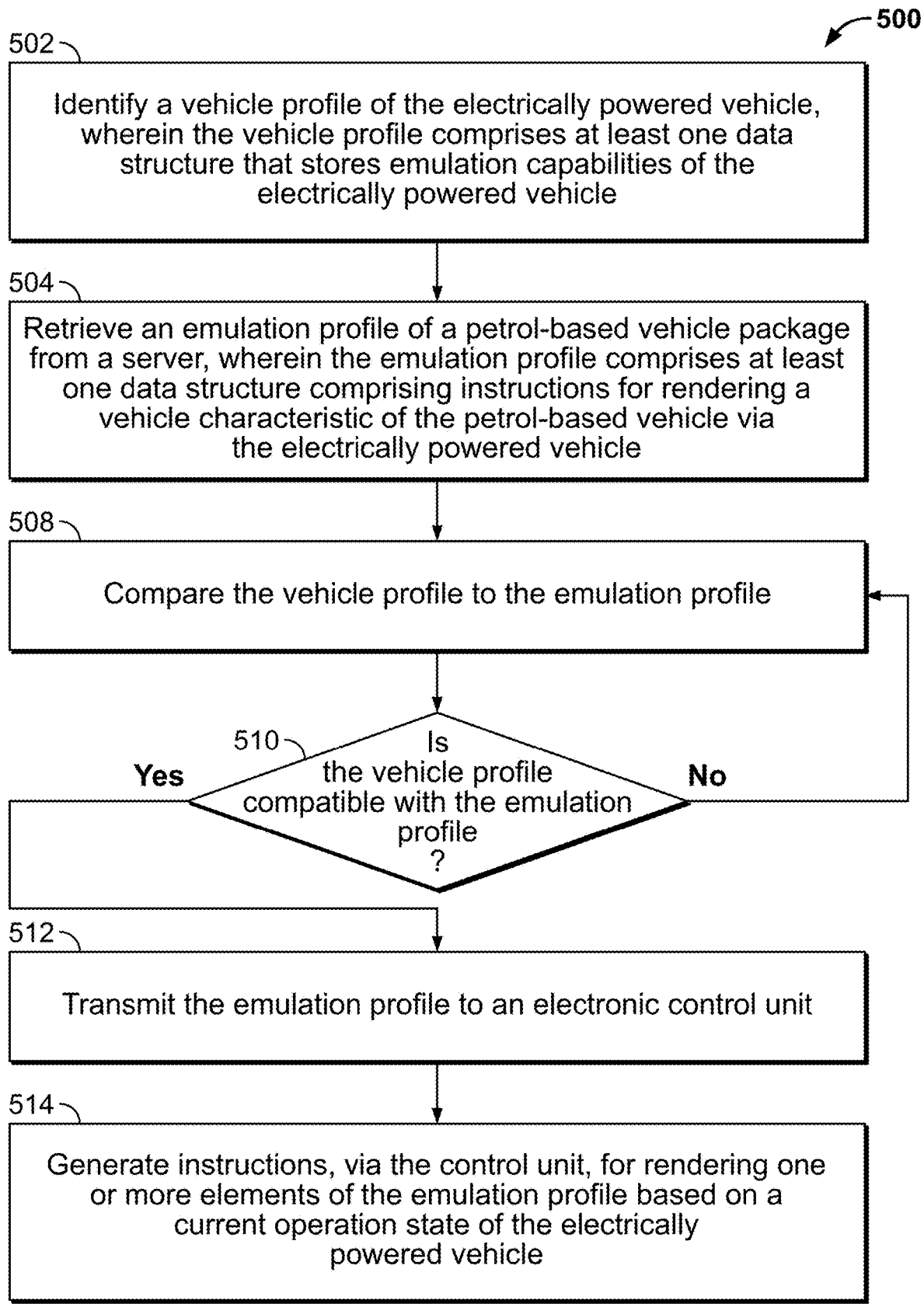
FIG. 5 is a flow chart representing an illustrative process for rendering a petrol-based vehicle emulation profile using an EV, in accordance with some embodiments of the disclosure.

FIG. 5 is a flow chart representing process 500 for rendering a petrol-based vehicle emulation profile using an EV, in accordance with some embodiments of the disclosure. Process 500 may be executed as part of an application or as part of a vehicle system operation. Process 500 may be executed based on computer readable instructions conveyed by a non-transitory computer readable medium when processed by one or more processors, control units, control circuitries, or processing circuitries of this disclosure (e.g., corresponding to one or more elements of EV system 100 of FIG. 1 or EV system 200 of FIG. 2). Process 500 may be incorporated into, in whole or in part, any process blocks of any or all of process 600 of FIG. 6, process 700 of FIG. 7, process 800 of FIG. 8, process 900A of FIG. 9A, process 900B of FIG. 9B, process 1000 of FIG. 10, process 1100A of FIG. 11A, process 1100B of FIG. 11B, or process 1200 of FIG. 12.

At process block 502, a vehicle profile of the electrically powered vehicle is identified (e.g., by control unit 124 of FIG. 1). The vehicle profile comprises at least one data structure that stores emulation capabilities of the electrically powered vehicle. For example, the EV profile includes one or more of an arrangement of speakers, actuators, suspension articulation ranges, steering parameters, accessories communicatively coupled to the EV, brake operational parameters, wheel and tire sizes, and any other suitable characteristic that can be utilized to identify or determine whether a particular EV includes appropriate architecture for emulating one or more performance or operational characteristics of a petrol-based vehicle. At process block 504, an emulation profile of a petrol-based vehicle package is retrieved form a server, wherein the emulation profile comprises at least one data structure comprising instructions for rendering a vehicle characteristic of the petrol-based vehicle via the electrically powered vehicle. At process block 508, the vehicle profile is compared to the emulation profile. Decision block 510 facilitates circuitry (e.g., control unit 124) determining compatibility of the vehicle profile and the emulation profile based on the comparing. For example, at least one of a road wheel torque output, wheel size, audio output apparatus arrangement, or other physical characteristic of the EV is expected to be configured to emulated at least one corresponding characteristic of the petrol-based vehicle. If it is determined the vehicle profile is not compatible with the emulation profile (NO at 510), process block 504 facilitates retrieving a different emulation profile. If it is determined the vehicle profile is compatible with the emulation profile (YES at 510), process block 512 facilitates transmission of the emulation profile to an electronic control unit (e.g., transmission from a data store or storage to control unit 124 for processing a generating instructions to be sent through a vehicle network to various other processing or control units). At process block 514, the control unit generates instructions for rendering one or more elements of the emulation profile based on a current operation state of the electrically powered vehicle. For example, the current operation state may be determined based on an EV motor output, an ignition flag, or a current gear (e.g., park, neutral, drive, or reverse).

Figure 6:
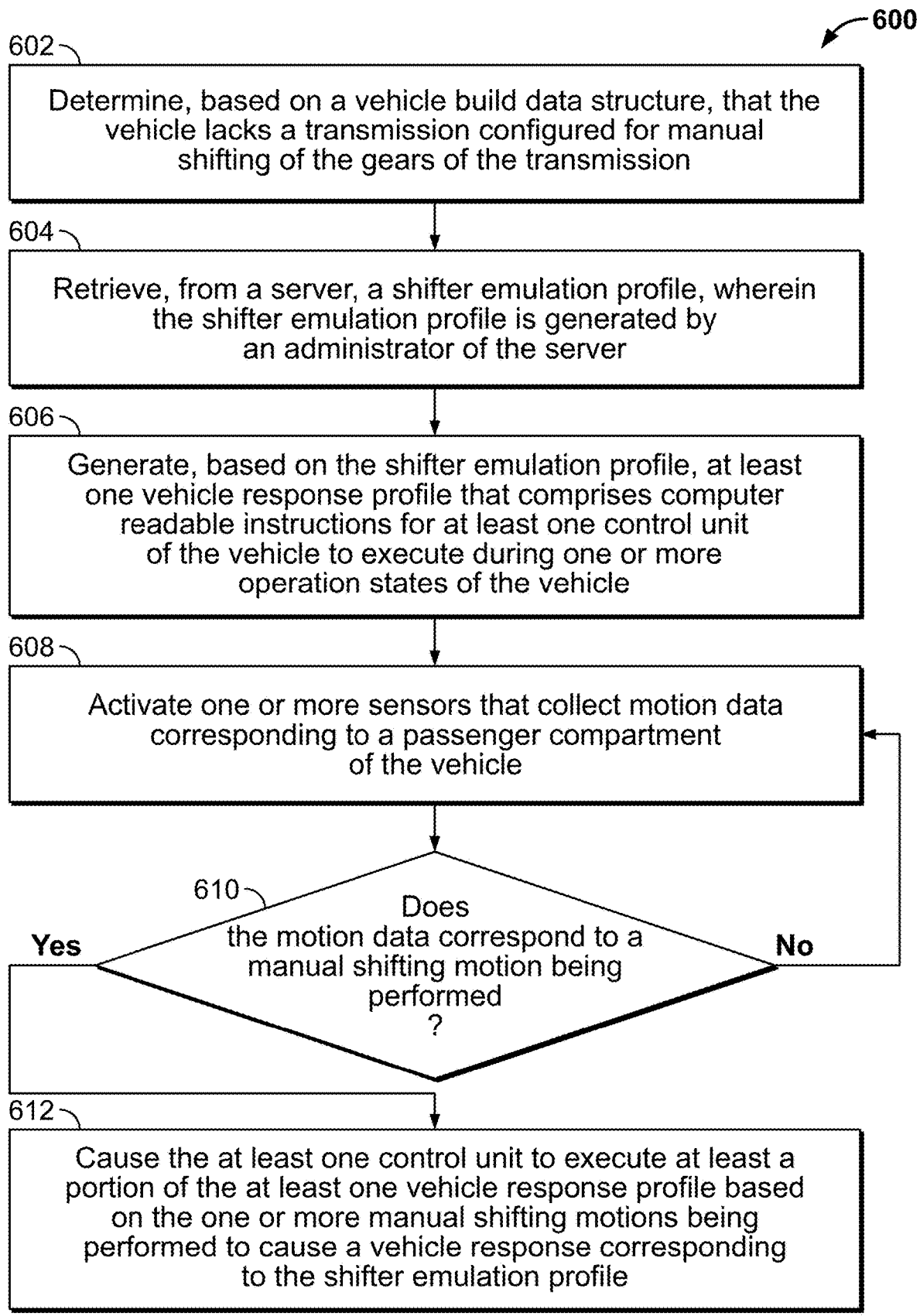
FIG. 6 is a flow chart representing an illustrative process for emulating manual transmission shifting in an EV based on motion data that characterizes motion of a vehicle occupant, in accordance with some embodiments of the disclosure.

FIG. 6 is a flow chart representing an illustrative process for emulating manual transmission shifting in an EV based on motion data that characterizes motion of a vehicle occupant, in accordance with some embodiments of the disclosure. Process 600 may be executed as part of an application or as part of a vehicle system operation. Process 600 may be executed based on computer readable instructions conveyed by a non-transitory computer readable medium when processed by one or more processors, control units, control circuitries, or processing circuitries of this disclosure (e.g., corresponding to one or more elements of EV system 100 of FIG. 1 or EV system 200 of FIG. 2). Process 600 may be incorporated into, in whole or in part, any process blocks of any or all of process 500 of FIG. 5, process 700 of FIG. 7, process 800 of FIG. 8, process 900A of FIG. 9A, process 900B of FIG. 9B, process 1000 of FIG. 10, process 1100A of FIG. 11A, process 1100B of FIG. 11B, or process 1200 of FIG. 12.

At process block 602, a control unit (e.g., control unit 124 of FIG. 1) determines that an EV (e.g., the vehicle that is expected to render at least a portion of an emulation profile) lack a transmission configured for manual shifting of the gears of the transmission based on a vehicle build data structure of the EV. For example, when the EV was manufactured, identifying data structures can be stored in one or more processors of the EV to provide service protocols and identifying data for maintaining operation of the EV, including various physical attributes such as motor torque output and wheel size. At process block 604, a shifter emulation profile is retrieved from a server. The shifter emulation profile is generated by an administrator of the server. For example, a vehicle manufacturer may produce an EV line of vehicles and a petrol-based line of vehicle that are considered related by model type, despite different powertrain and transmission configurations. The vehicle manufacturer may generate data structures for emulating one or more elements of the petrol-based vehicle build (e.g., with a manual transmission) for emulation by an EV version of the vehicle build. In some embodiments, the manufacturer sourced data structure is provided based on access to an emulation application by an EV purchaser. When one or more of the emulation application is activated or the data structure is selected (e.g., after purchasing and while the EV is in a stable operating state), at least the portion of the emulation profile to be emulated is retrieved. In this example, an EV has a shifter accessory configured for manual transmission shift-based feedback emulation and the shifter emulation portion of the emulation profile is provided.

At process block 606, at least one vehicle response profile that comprises computer readable instructions for at least one control unit of the vehicle to execute during one or more operation states of the vehicle is generated based on the shifter emulation profile. For example, one or more of audio output generation criteria, haptic feedback output rendering criteria, or display update criteria is generated for execution by respective processors, or circuitry, of respective vehicle network nodes, or control units. At process block 608, one or more sensors are activated. The one or more sensors collect motion data corresponding to a passenger compartment of the vehicle (e.g., occupant camera 156 of FIG. 1). Decision block 610 facilitates determining whether the motion data, when processed, indicates a shifting motion (e.g., grabbing a shifter knob and articulating a shifter lever between slots). If it is determined that the motion data does not correspond to a manual shifting motion being performed (NO at 610), process block 608 facilitates continued collection of motion data until a shifting motion is identified. If it is determined that the motion data corresponds to a manual shifting motion being performed (YES at 610), process block 612 facilitates causing the at least one control unit to execute at least a portion of the at least one vehicle response profile based on the one or more manual shifting motions being performed to cause a vehicle response corresponding to the shifter emulation profile. For example, a current operating state of the EV may indicate a certain RPM and the shifting motion, combined with a clutch engagement flag being received, results in a shifter accessory providing a form of haptic feedback (e.g., mechanical resistance or vibration perceivable by an EV occupant).

Figure 7:
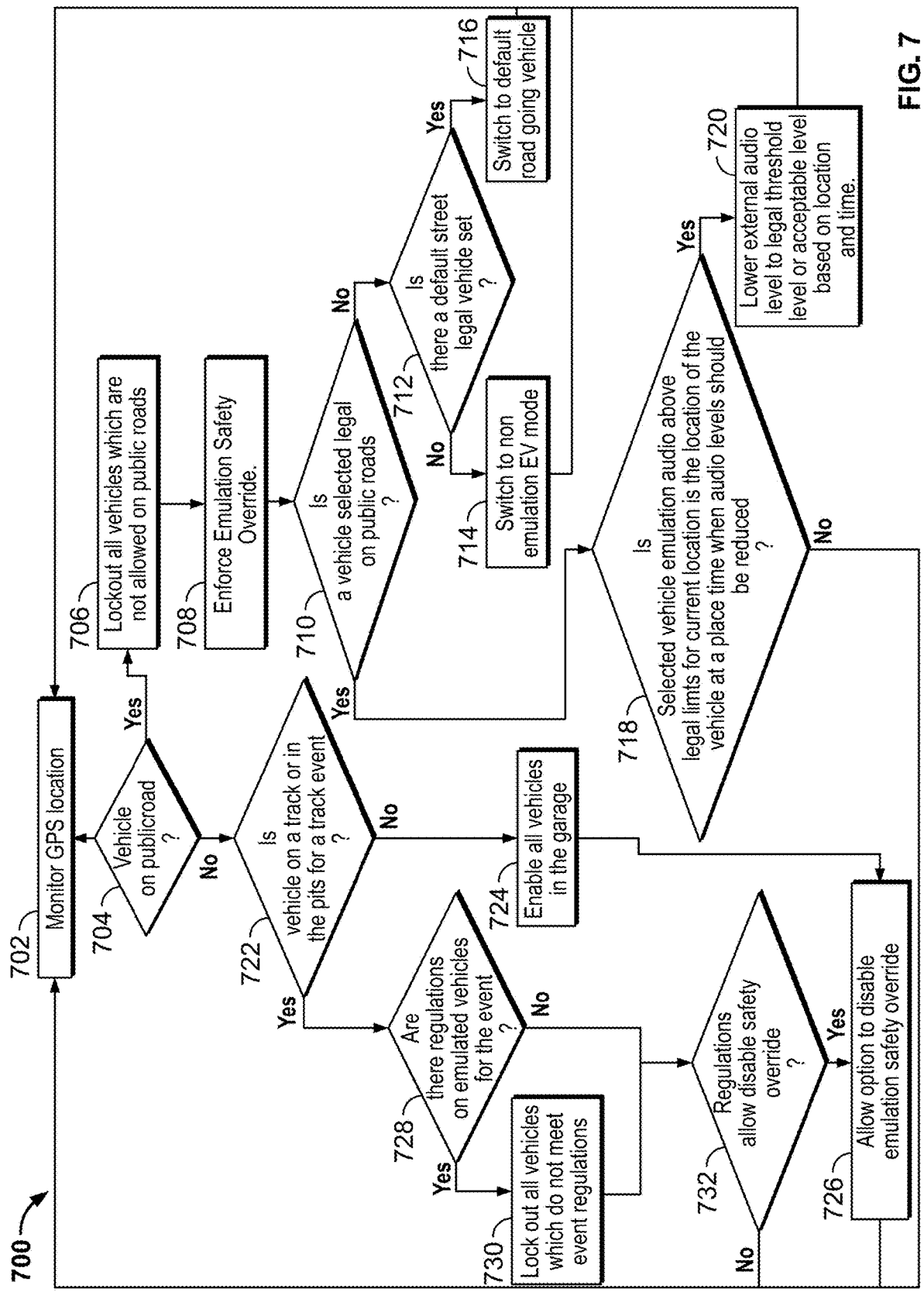
FIG. 7 is a flow chart representing an illustrative process for locking out elements of an emulation profile based on an EV location, in accordance with some embodiments of the disclosure.

FIG. 7 is a flow chart representing an illustrative process for locking out elements of an emulation profile based on an EV location, in accordance with some embodiments of the disclosure. Process 700 may be executed as part of an application or as part of a vehicle system operation. Process 700 may be executed based on computer readable instructions conveyed by a non-transitory computer readable medium when processed by one or more processors, control units, control circuitries, or processing circuitries of this disclosure (e.g., corresponding to one or more elements of EV system 100 of FIG. 1 or EV system 200 of FIG. 2). Process 700 may be incorporated into, in whole or in part, any process blocks of any or all of process 500 of FIG. 5, process 600 of FIG. 6, process 800 of FIG. 8, process 900A of FIG. 9A, process 900B of FIG. 9B, process 1000 of FIG. 10, process 1100A of FIG. 11A, process 1100B of FIG. 11B, or process 1200 of FIG. 12.

At process block 702, a GPS location is monitored (e.g., wherein the GPS location is defined at least in part by GPS data 212 of FIG. 2 as provided by a GPS system of an EV or a smart mobile device communicatively coupled to the EV). Decision block 704 facilitates determining whether the EV is on a public road (e.g., based on GPS data 212 or based on metadata associated with GPS data 212). If it is determined the vehicle is on a public road (YES at 704), process block 706 facilitates generating instructions to lockout all vehicle emulation profiles that are not allowed on public roads. At process block 708, the emulation safety override is enforced (e.g., where emulation override control 206 of FIG. 2 interfaces with EV control unit 124 to lock or halt processing performed by emulation controller 202).

Decision block 710 facilitates determining whether a selected vehicle emulation profile is legal on public roads. If it is determined that the selected vehicle emulation profile is not legal on public roads (NO at 710), decision block 712 facilitates determining whether there is a default street legal emulation profile to make active in the EV. If it is determined that there is not a default street legal vehicle emulation profile (NO at 712), process block 714 facilitates switching to a non-emulation EV operation mode (e.g., corresponding to a factory default setting of EV operation that does not update any aspect of operation to try to emulate a different vehicle build) and process block 702 facilitates monitoring the GPS location of the EV to determine if emulation operation should be updated. If it is determined there is a default street legal vehicle emulation profile (YES at 714), process block 716 facilitates switching to a default street legal road worthy vehicle emulation profile for execution by the EV during operation and process block 702 facilitates monitoring the GPS location of the EV to determine if emulation operation should be updated.

If it is determined that the selected vehicle emulation profile is legal on public roads (YES at 710), decision block 718 facilitates determining if the selected vehicle emulation profile includes audio output generating criteria is in conflict with audio generation regulations (e.g., based on one or more of magnitude of volume or time of day). If it is determined there is a conflict between the audio generation regulations and the audio output generating criteria (YES at 718), process block 720 facilitates lowering the external audio output generating instructions (e.g., by lowering the output volume or output frequency) to a threshold that complies with the audio generation regulations (e.g., based on one or more of magnitude or time of day and process block 702 facilitates monitoring the GPS location of the EV to determine if emulation operation should be updated. If it is determined there is not a conflict between the audio generation regulations and the audio output generating criteria (NO at 718), process block 702 facilitates monitoring the GPS location of the EV to determine if emulation operation should be updated.

If it is determined the vehicle is not on a public road (NO at 704), decision block 722 facilitates determining if the EV is on a track or in the pits for a track event. If it is determined the vehicle is not on a track or in the pits of a track event (NO at 722), process block 724 facilitates enabling access to all vehicle emulation profiles in a virtual garage associated with the EV for selection and causing the EV to emulate the selected vehicle from the selected vehicle emulation profile. At process block 726, an option to disable the emulation safety override of this disclosure is presented (e.g., corresponding to emulation override controller 206 of FIG. 2 providing a selectable option or deciding to override the emulation being performed to preserve vehicle occupant safety based on processing of real-time EV operational data) and process block 702 facilitates monitoring the GPS location of the EV to determine if emulation operation should be updated. If it is determined the vehicle is on a track or in the pits of a track event (YES at 722), decision block 728 facilitates determining if regulations of the event restrict the ability to use certain emulation profiles through an EV.

If it is determined there are regulations to restrict which vehicle emulation profiles can be active (YES at 728), process block 730 facilitates preventing access to (e.g., locking out) all vehicle emulation profiles in the virtual EV garage that do not meet event regulations and decision block 732 facilitates determining if the regulations of the event allow EV occupants to disable safety overrides of active emulation profiles. If it is determined there are not regulations to restrict which vehicle emulation profiles can be active (NO at 728), decision block 732 facilitates determining if the regulations of the event allow EV occupants to disable safety overrides of active emulation profiles. If it is determined there are regulations permitting disabling the emulation safety override (YES at 732), process block 726 facilitates causing an option to disable the emulation safety override of this disclosure is presented (e.g., corresponding to emulation override controller 206 of FIG. 2 providing a selectable option or deciding to override the emulation being performed to preserve vehicle occupant safety based on processing of real-time EV operational data) and process block 702 facilitates monitoring the GPS location of the EV to determine if emulation operation should be updated. If it is determined there are regulations prohibiting disabling the emulation safety override (NO at 732), process block 702 facilitates monitoring the GPS location of the EV to determine if emulation operation should be updated.

Figure 8:
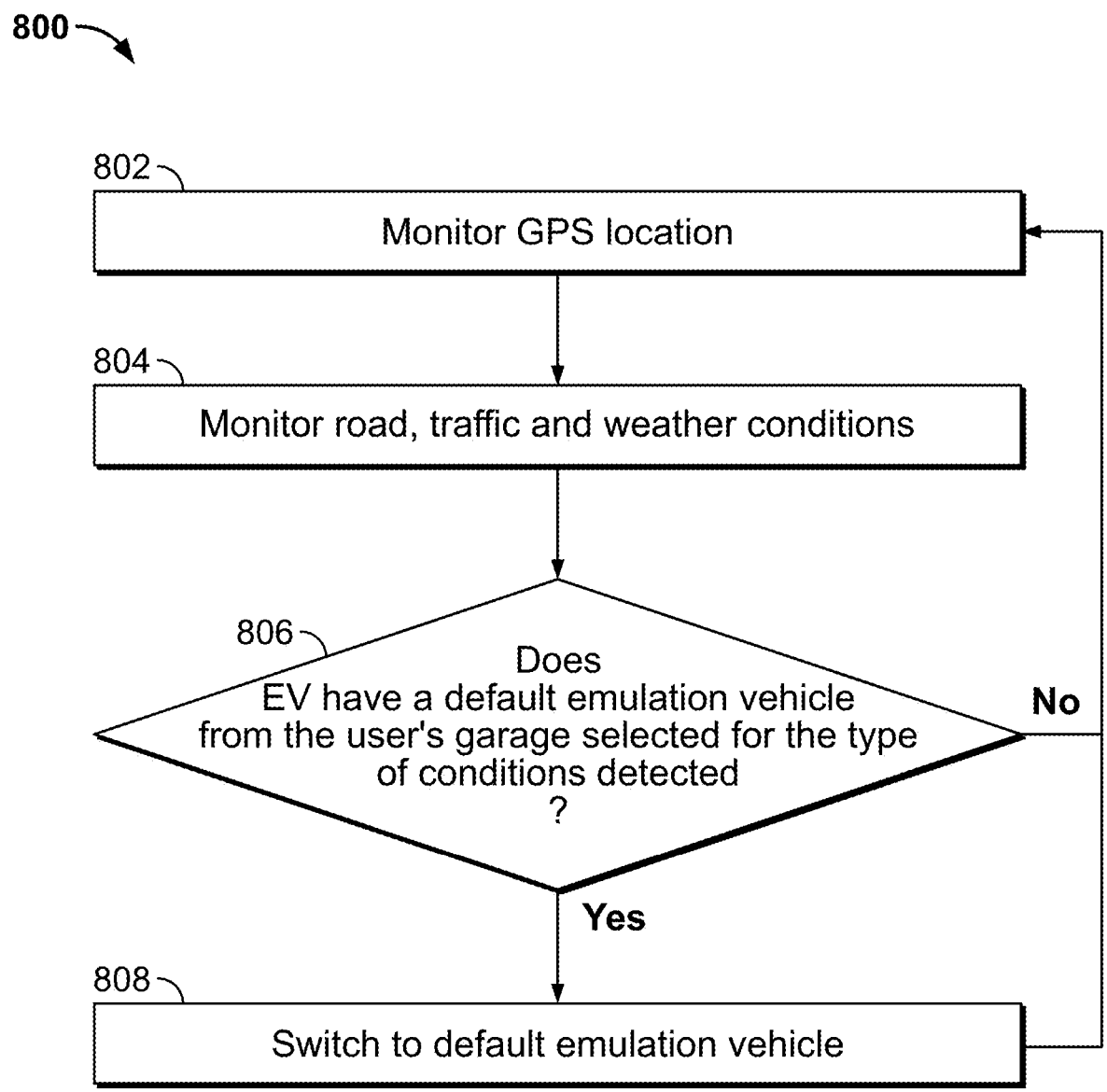
FIG. 8 is a flow chart representing an illustrative process for locking out elements of an emulation profile based on an EV location, in accordance with some embodiments of the disclosure.
Figure 9:
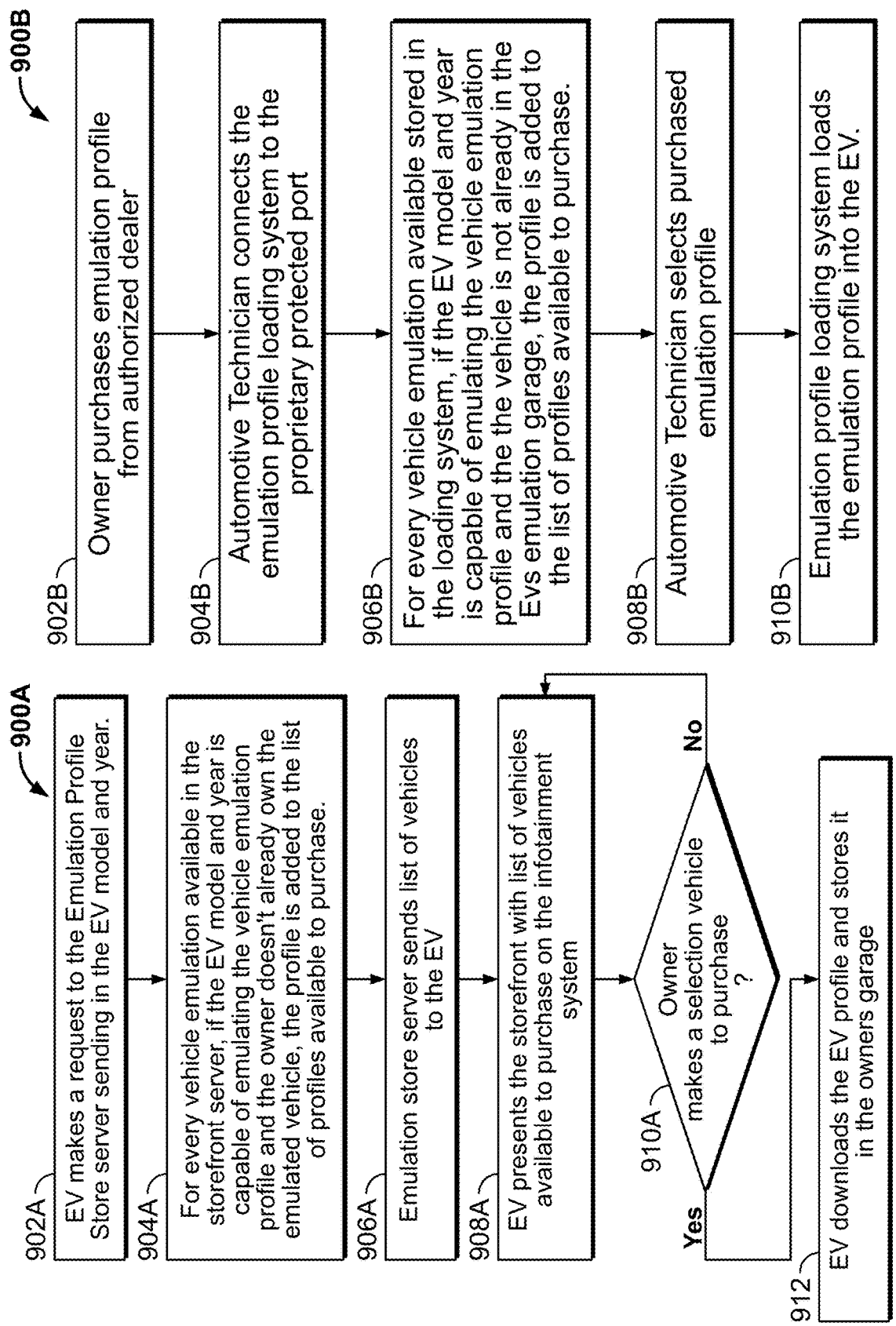
FIG. 9A is a flow chart representing an illustrative process for enabling access to emulation profiles, in accordance with some embodiments of the disclosure.
FIG. 9B is a flow chart representing an illustrative process for enabling a dealer to provide access to emulation profiles, in accordance with some embodiments of the disclosure.

FIG. 8 is a flow chart representing an illustrative process for locking out elements of an emulation profile based on an EV location, in accordance with some embodiments of the disclosure. Process 800 may be executed as part of an application or as part of a vehicle system operation. Process 800 may be executed based on computer readable instructions conveyed by a non-transitory computer readable medium when processed by one or more processors, control units, control circuitries, or processing circuitries of this disclosure (e.g., corresponding to one or more elements of EV system 100 of FIG. 1 or EV system 200 of FIG. 2). Process 800 may be incorporated into, in whole or in part, any process blocks of any or all of process 500 of FIG. 5, process 600 of FIG. 6, process 700 of FIG. 7, process 900A of FIG. 9A, process 900B of FIG. 9B, process 1000 of FIG. 10, process 1100A of FIG. 11A, process 1100B of FIG. 11B, or process 1200 of FIG. 12.

At process block 802, a GPS location of an EV configured to emulate petrol-based vehicle builds based on an emulation profile is monitored. At process block 804, data corresponding to road, traffic, and weather conditions along a planned navigation path or a navigation path that is historically taken during a current timeframe (e.g., commute to work or commute from work to home) is collected and monitored by one or more control units of the EV or control units communicatively coupled to the EV. Decision block 806 facilitates determining whether the EV has a default emulation profile from an EV owner's virtual emulation profile garage associated with the EV where the default emulation profile is considered to provide emulation outputs for the EV that facilitate optimum EV performance for given road, traffic, and weather conditions. If it is determined there is not a default emulation profile for current conditions (NO at 806), process block 802 facilitates monitoring a current GPS location. If it is determined there is a default emulation profile for current conditions (YES at 806), process block 808 facilitates causing the EV to switch from a current operating state to an emulation state based on the default emulation profile for the current conditions.

FIG. 9A is a flow chart representing process 900A for enabling access to emulation profiles, in accordance with some embodiments of the disclosure. Process 900A may be executed as part of an application or as part of a vehicle system operation. Process 900A may be executed based on computer readable instructions conveyed by a non-transitory computer readable medium when processed by one or more processors, control units, control circuitries, or processing circuitries of this disclosure (e.g., corresponding to one or more elements of EV system 100 of FIG. 1 or EV system 200 of FIG. 2). Process 900A may be incorporated into, in whole or in part, any process blocks of any or all of process 500 of FIG. 5, process 600 of FIG. 6, process 700 of FIG. 7, process 800 of FIG. 8, process 900B of FIG. 9B, process 1000 of FIG. 10, process 1100A of FIG. 11A, process 1100B of FIG. 11B, or process 1200 of FIG. 12.

At process block 902A, an EV system generates a request to an emulation profile store server that includes identifiers of the EV system including an EV model year and which EV model includes the EV system generating the request. At process block 904A, a determination is made of which emulation profiles on the server are compatible with the EV comprising the EV system that generated the request, which is based at least in part on whether an owner of the EV with the EV system has already purchased the vehicle characterized by the emulation profile or if the owner has already purchased the emulation profile. At process block 906A, the emulation store server sends the list of vehicle emulation profiles that are compatible with the EV comprising the EV system and have not been purchased by the EV owner. At process block 908A, the EV presents a storefront (e.g., as shown in FIG. 3A) with a list of vehicles available to purchase (e.g., via infotainment display 110 of FIG. 1). Decision block 910A facilitates determining whether the owner of the EV has selected an emulation profile for purchase. If it is determined the owner did not select an emulation profile to purchase (NO at 910A), process block 908A facilitates continued presentation of the storefront until a new input is received. If it is determined the owner did select an emulation profile to purchase (YES at 910A), process block 912 facilitates downloading the purchase emulation profile for storage in one or more of the EV data stores, an application data store, or a data storage apparatus corresponding to the EV owner's virtual emulation profile garage.

FIG. 9B is a flow chart representing process 900B for enabling a dealer to provide access to emulation profiles, in accordance with some embodiments of the disclosure. Process 900B may be executed as part of an application or as part of a vehicle system operation. Process 900B may be executed based on computer readable instructions conveyed by a non-transitory computer readable medium when processed by one or more processors, control units, control circuitries, or processing circuitries of this disclosure (e.g., corresponding to one or more elements of EV system 100 of FIG. 1 or EV system 200 of FIG. 2). Process 900B may be incorporated into, in whole or in part, any process blocks of any or all of process 500 of FIG. 5, process 600 of FIG. 6, process 700 of FIG. 7, process 800 of FIG. 8, process 900A of FIG. 9A, process 1000 of FIG. 10, process 1100A of FIG. 11A, process 1100B of FIG. 11B, or process 1200 of FIG. 12.

At process block 902B, an EV owner purchase an emulation profile from an authorized dealer (e.g., as described in reference to FIG. 9A). At process block 904B, an automotive technician connects an emulation profile loading system to a proprietary protected port (e.g., where the port could be a standard OBD-II port or the port is a unique EV port only accessible by licensed technicians of the EV manufacturer). At process block 906B, each available emulation profile is compared to EV model and year data to determine compatibility. Additionally, each emulation profile is compared to existing emulation profiles in the EV owner's virtual emulation profile garage. Where there are new and compatible emulation profiles, these emulation profiles are presented for review. At process block 908B, the automotive technician facilitates selecting a purchased compatible and unloaded emulation profile for subsequent processing. At process block 910B, an emulation profile loading system facilitates providing, or loading, the purchased emulation profile on the EV system of the EV of the owner who purchased the emulation profile.

Figure 10:
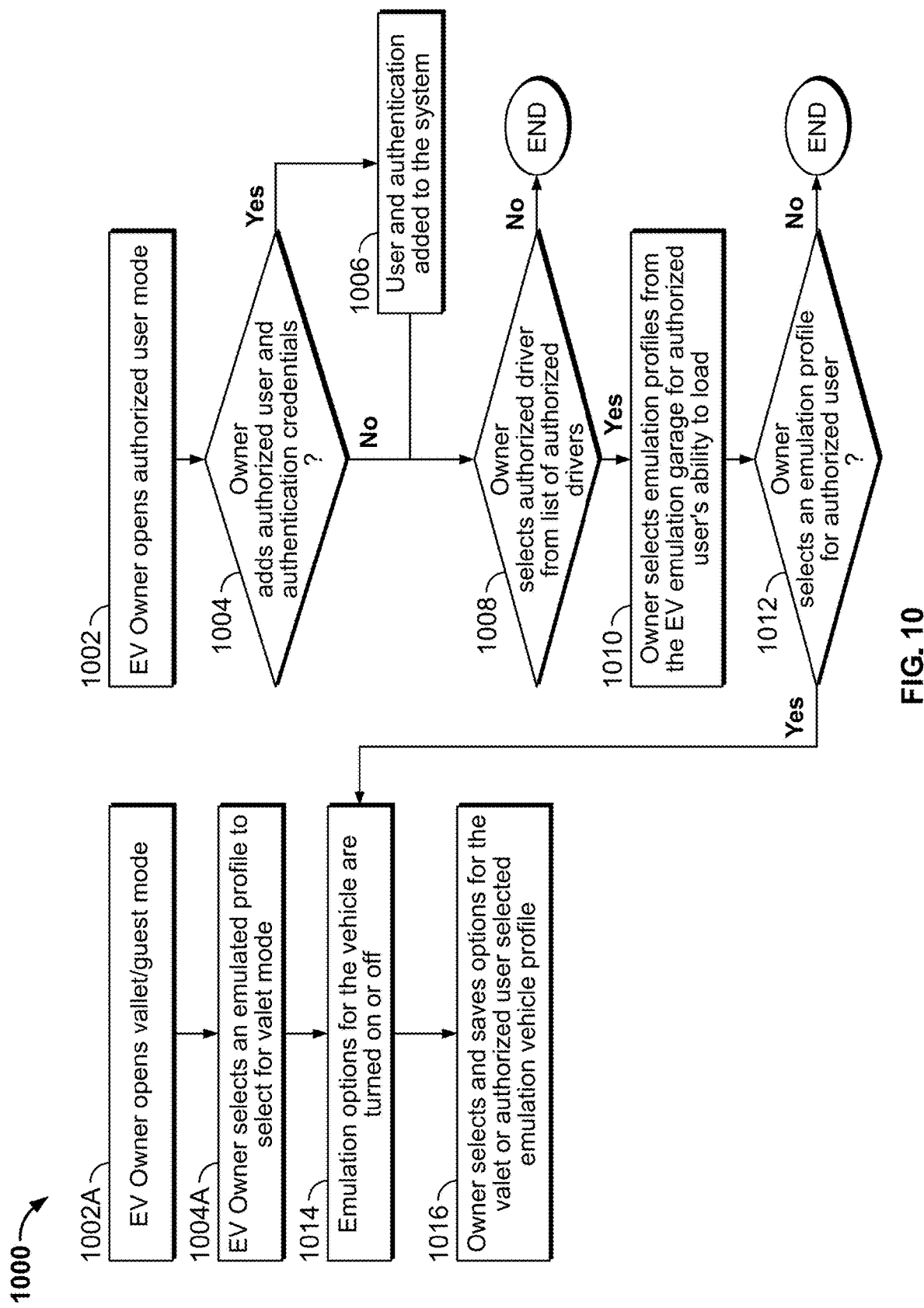
FIG. 10 is a flow chart representing an illustrative process for modifying access to EV vehicle settings, in accordance with some embodiments of the disclosure.

FIG. 10 is a flow chart representing process 1000 for modifying access to EV vehicle settings, in accordance with some embodiments of the disclosure. Process 1000 may be executed as part of an application or as part of a vehicle system operation. Process 1000 may be executed based on computer readable instructions conveyed by a non-transitory computer readable medium when processed by one or more processors, control units, control circuitries, or processing circuitries of this disclosure (e.g., corresponding to one or more elements of EV system 100 of FIG. 1 or EV system 200 of FIG. 2). Process 1000 may be incorporated into, in whole or in part, any process blocks of any or all of process 500 of FIG. 5, process 600 of FIG. 6, process 700 of FIG. 7, process 800 of FIG. 8, process 900A of FIG. 9A, process 900B of FIG. 9B, process 1100A of FIG. 11A, process 1100B of FIG. 11B, or process 1200 of FIG. 12.

At process block 1002, an EV owner opens an authorized user mode (e.g., a mode for selecting and updating various security and authorization protocols of an EV system configured for emulation). Decision block 1004 facilitates determining if the owner added a new authorized user with authentication credentials (e.g., one or more of a username, password, or biometric authentication criteria). If it is determined the owner did add a new authorized user with authentication credentials (YES at 1004), process block 1006 facilitates adding the user and the authentication credentials to the system. If it is determined the owner did not add a new authorized user with authentication credentials (NO at 1004), decision block 1008 facilitates determining whether the owner selected an authorized driver from a list of authorized drivers. If it is determined the owner did not select an authorized driver from the list (NO at 1008), process 1000 terminates. If it is determined the owner did select an authorized driver from the list (YES at 1008), process block 1010 facilitates determining that the owner selected an emulation profile from a virtual emulation profile garage for loading and activating in the EV. Decision block 1012 facilitates determining whether the owner selected an emulation profile for access by an authorized user. If it is determined the owner did not select an emulation profile for access by an authorized user (NO at 1012), process 1000 terminates.

If it is determined the owner did select an emulation profile for access by an authorized user (YES at 1012), process block 1014 facilitates determining whether emulation settings for a selected emulation profile are on or off (e.g., for providing the owner an option to authorize use of different emulation profiles by different user of the EV). Process block 1014 can also receive inputs related to one or more of process block 1002A and process block 1004A. Process block 1002A facilitates the EV system determining that the EV owner activated a valet or guest operational mode for the EV system. At process block 1004A, the EV owner selects an emulated profile to select for the valet or guest mode. At process block 1014, the selected emulation profile is determined to have emulation options on or off (e.g., based on an EV operational mode such as valet or guest operational modes). At process block 1016, the EV owner selects and saves options for one or more of a valet, a guest user, or an authorized user if the credential driven list of authorized users.

Figure 11B:
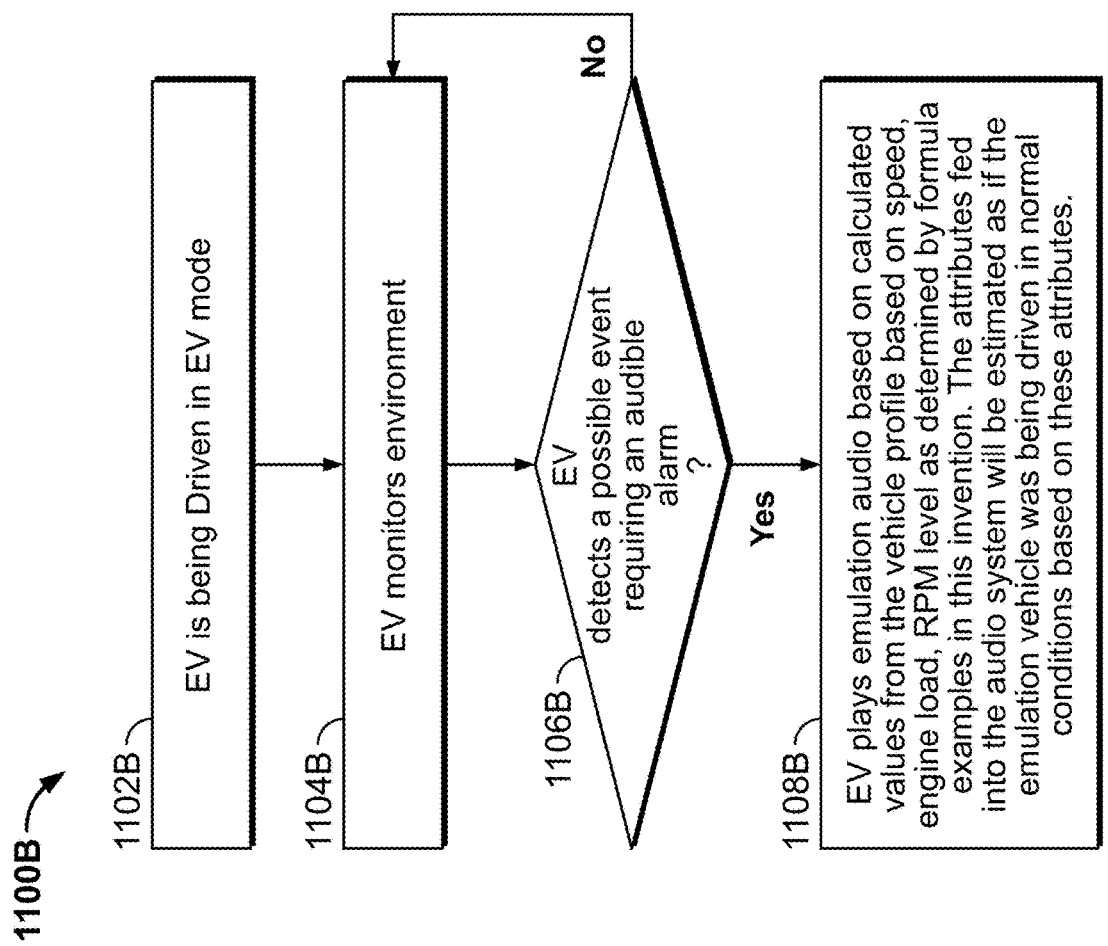
FIG. 11B is a flow chart representing an illustrative process for generating an audible alarm through an EV based on an emulation profile, in accordance with some embodiments of the disclosure.
Figure 11A:
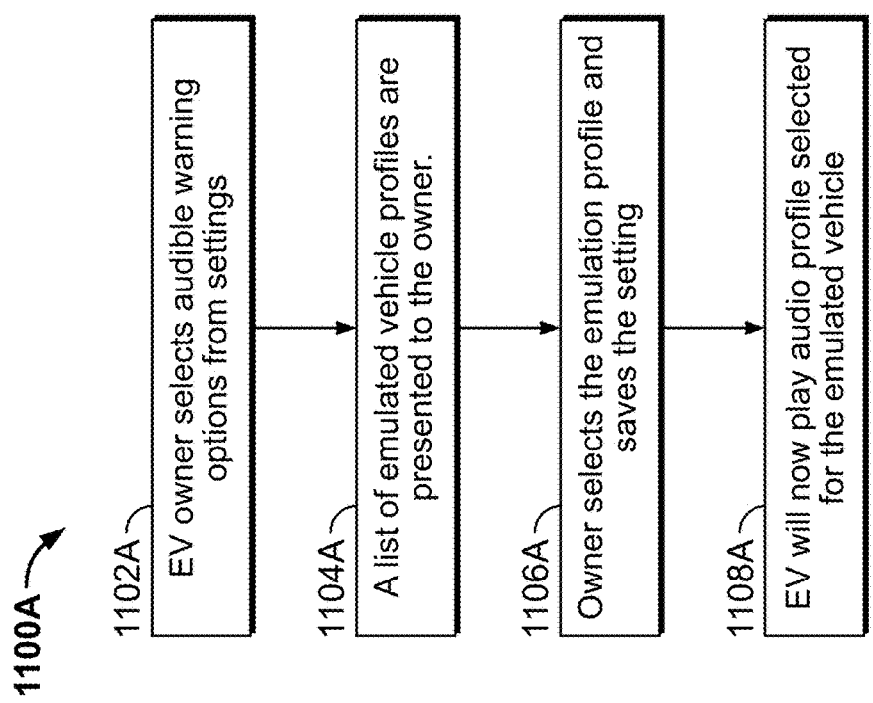
FIG. 11A is a flow chart representing an illustrative process for enabling an EV to generate audio based on an emulation profile, in accordance with some embodiments of the disclosure.

FIG. 11A is a flow chart representing process 100A for enabling an EV to generate audio based on an emulation profile, in accordance with some embodiments of the disclosure. Process 1100A may be executed as part of an application or as part of a vehicle system operation. Process 1100A may be executed based on computer readable instructions conveyed by a non-transitory computer readable medium when processed by one or more processors, control units, control circuitries, or processing circuitries of this disclosure (e.g., corresponding to one or more elements of EV system 100 of FIG. 1 or EV system 200 of FIG. 2). Process 1100A may be incorporated into, in whole or in part, any process blocks of any or all of process 500 of FIG. 5, process 600 of FIG. 6, process 700 of FIG. 7, process 800 of FIG. 8, process 900A of FIG. 9A, process 900B of FIG. 9B, process 1000 of FIG. 10, process 1100B of FIG. 11B, or process 1200 of FIG. 12.

At process block 1102A, an EV owner selected audible warning options from settings (e.g., corresponding to one or more of location conditions, volume magnitudes, or driving conditions including traffic volume). At process block 1104A, a list of emulated vehicle profiles are presented to the owner. At process block 1106A, the EV owner selects the emulation profile desired for a set of settings correlated to audible warning settings. At process block 1108A, the EV facilitates generation of audio outputs based on the selected emulation profile audio output generating criteria.

FIG. 11B is a flow chart representing an illustrative process for generating an audible alarm through an EV based on an emulation profile, in accordance with some embodiments of the disclosure. Process 1100B may be executed as part of an application or as part of a vehicle system operation. Process 1100B may be executed based on computer readable instructions conveyed by a non-transitory computer readable medium when processed by one or more processors, control units, control circuitries, or processing circuitries of this disclosure (e.g., corresponding to one or more elements of EV system 100 of FIG. 1 or EV system 200 of FIG. 2). Process 1100B may be incorporated into, in whole or in part, any process blocks of any or all of process 500 of FIG. 5, process 600 of FIG. 6, process 700 of FIG. 7, process 800 of FIG. 8, process 900A of FIG. 9A, process 900B of FIG. 9B, process 1000 of FIG. 10, process 1100A of FIG. 11A, or process 1200 of FIG. 12.

At process block 1102B, a determination is made by an EV system of this disclosure that an EV comprising the EV system is being driven in a nominal operation mode and not in an emulation mode. At process block 1104B, the EV system monitors an environment around the EV system (e.g., using one or more of proximity sensors, cameras, or current driving condition information correlated to GPS data). Decision block 1106B facilitates determining if an event is apparent or imminent that requires an audible alarm (e.g., another vehicle or pedestrian approaching which may cause imminent impact if not deterred or warned). If it is determined an imminent event is not apparent (NO at 1106B), process block 1104B facilitates continued monitoring of the vehicle surroundings. If it is determined an imminent event is apparent (YES at 1106B), process block 1108B enables the EV to generate audio outputs based on current emulation and operational conditions of the EV as described in this disclosure.

Figure 12:
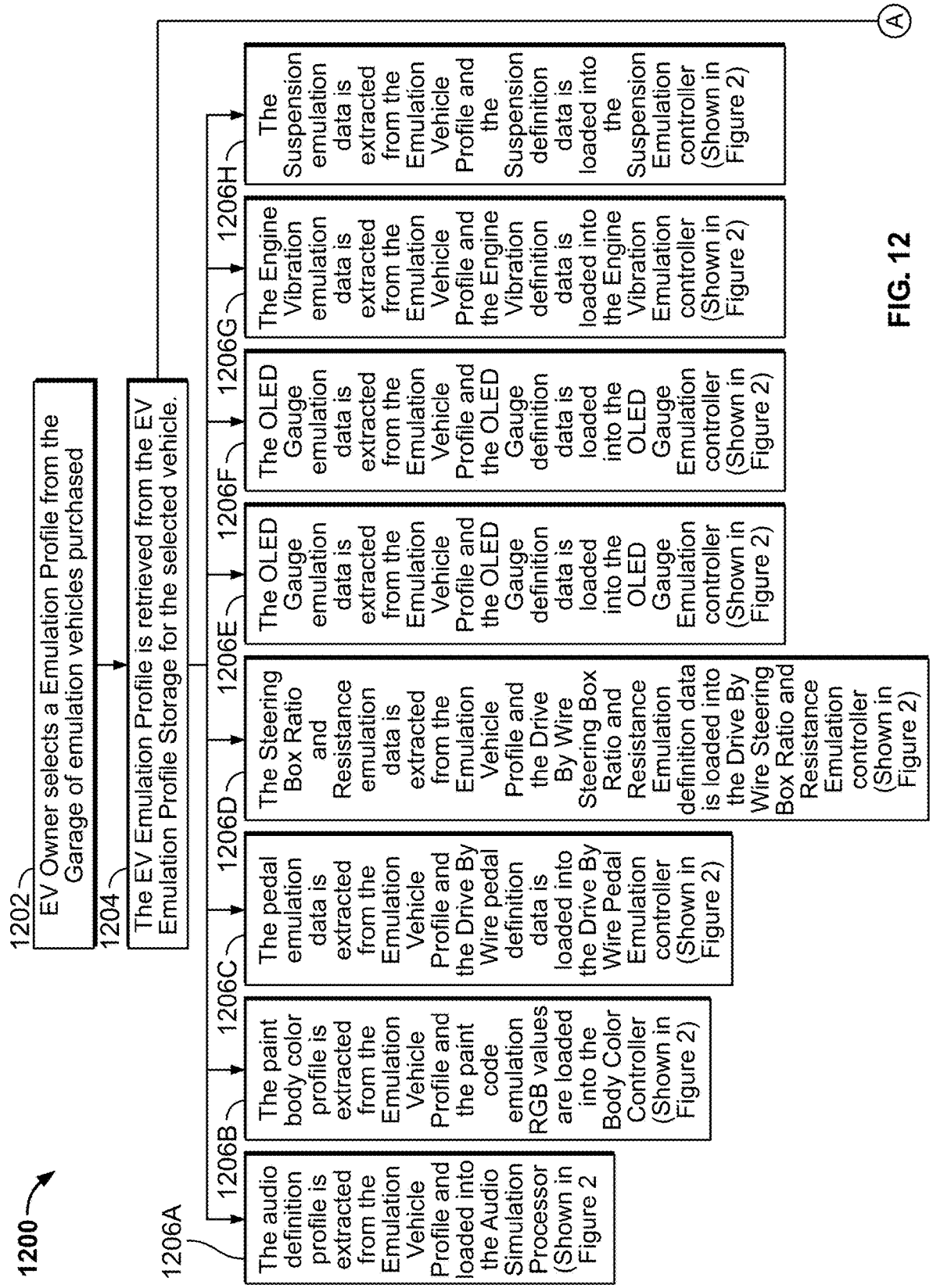
FIG. 12 is a flow chart representing an illustrative process for providing and rendering an emulation profile through an EV vehicle, in accordance with some embodiments of the disclosure.
Figure 12:
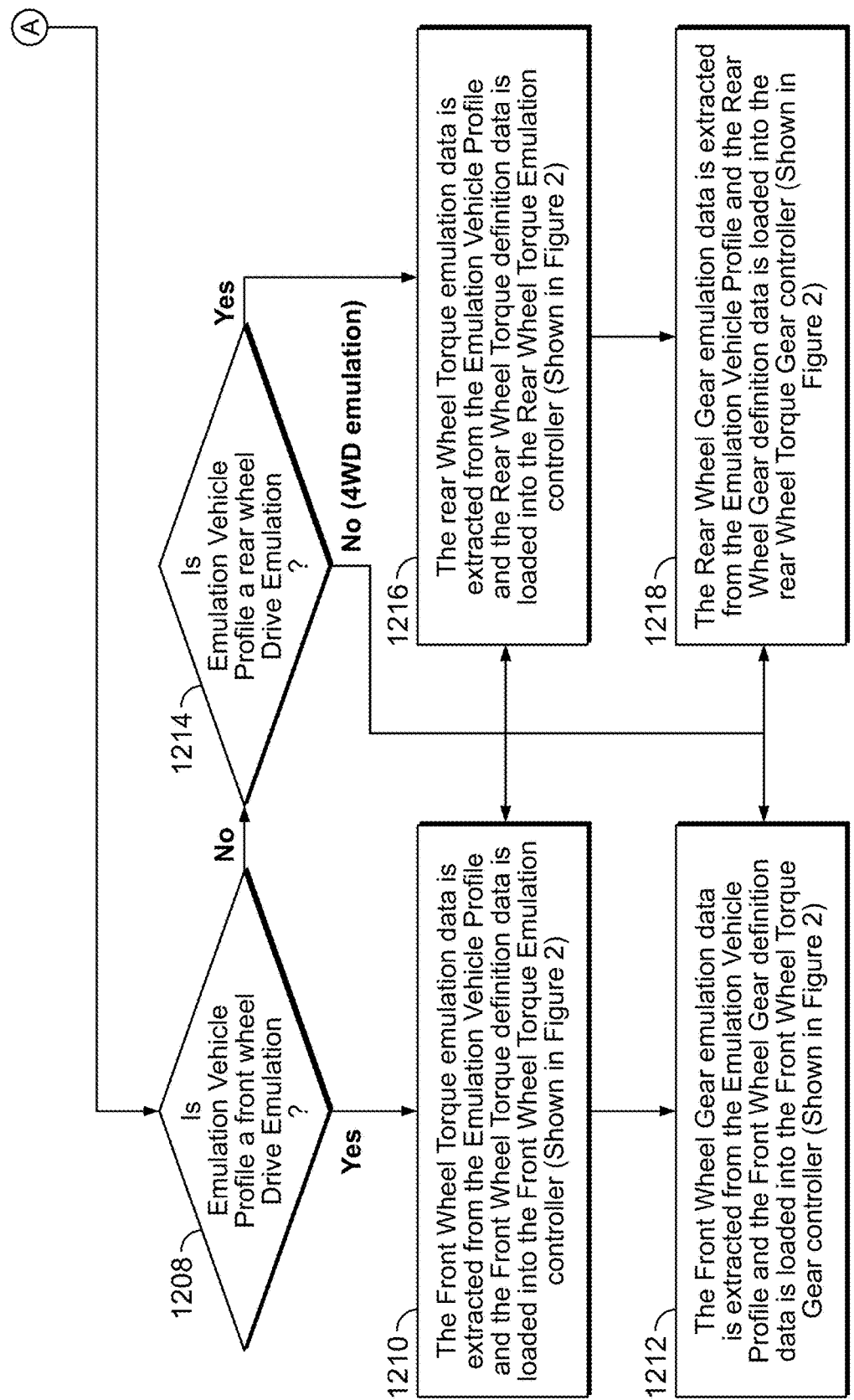

FIG. 12 is a flow chart representing an illustrative process for providing and rendering an emulation profile through an EV vehicle, in accordance with some embodiments of the disclosure. Process 1200 may be executed as part of an application or as part of a vehicle system operation. Process 1200 may be executed based on computer readable instructions conveyed by a non-transitory computer readable medium when processed by one or more processors, control units, control circuitries, or processing circuitries of this disclosure (e.g., corresponding to one or more elements of EV system 100 of FIG. 1 or EV system 200 of FIG. 2). Process 1200 may be incorporated into, in whole or in part, any process blocks of any or all of process 500 of FIG. 5, process 600 of FIG. 6, process 700 of FIG. 7, process 800 of FIG. 8, process 900A of FIG. 9A, process 900B of FIG. 9B, process 1000 of FIG. 10, process 1100A of FIG. 11A, or process 1100B of FIG. 11B.

At process block 1202, an EV owner selects an emulation profile from a virtual garage of emulation profiles that have been purchased. At process block 1204, the selected emulation profile is retrieved from an EV emulation profile storage for a selected vehicle. The selected emulation profile includes data structures, or data packets or nodes, 1206A-H, which each define respective emulation parameters and criteria as shown in FIG. 12 and described in reference to other figures of this disclosure. Decision block 1208 facilitates determining whether the selected emulation profile provides rendering criteria for front wheel drive emulation. If it is determined the selected emulation profile includes front wheel drive emulation criteria (YES at 1208), process block 1210 facilitates extracting front wheel torque emulation data for loading to an emulation controller as shown and described in reference to FIG. 2. At process block 1212, front wheel gear emulation data (e.g., corresponding to a gear mesh between a front axle motor of the EV and a front axle transmission of the EV which facilitate rotational outputs to front road wheels) is provided to an emulation controller as shown and described in reference to FIG. 2.

If it is determined the selected emulation profile does not include front wheel drive emulation criteria (NO at 1208), decision block 1214 facilitates determining whether the selected emulation profile provides rendering criteria for rear wheel drive emulation. If it is determined the selected emulation profile does not include rear wheel drive emulation criteria (NO at 1214), process blocks 1210 and 1212 facilitate four wheel drive emulation. If it is determined the selected emulation profile does include rear wheel drive emulation criteria (YES at 1214), process block 1216 facilitates extracting rear wheel torque emulation data for loading to an emulation controller as shown and described in reference to FIG. 2. At process block 1218, rear wheel gear emulation data (e.g., corresponding to a gear mesh between a rear axle motor of the EV and a rear axle transmission of the EV which facilitate rotational outputs to front road wheels) is provided to an emulation controller as shown and described in reference to FIG. 2.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method for emulating manually shifting gears of a transmission in a vehicle without a transmission configured for manual shifting, the method comprising:
    determining, using processing circuitry and based on a vehicle build data structure, that the vehicle lacks a transmission configured for manual shifting of the gears of the transmission;
    retrieving, using processing circuitry and from a data store, a shifter emulation profile, wherein the shifter emulation profile is generated by an administrator of the data store;
    generating, using the processing circuitry and based on the shifter emulation profile, at least one vehicle response profile that comprises computer readable instructions for at least one control unit of the vehicle to execute during one or more operation states of the vehicle;
    activating, using the processing circuitry, one or more sensors that collect motion data corresponding to a passenger compartment of the vehicle;
    determining, using the processing circuitry and based on the motion data, one or more manual shifting motions is being performed; and
    causing, using the processing circuitry, the at least one control unit to execute at least a portion of the at least one vehicle response profile based on the one or more manual shifting motions being performed to cause a vehicle response corresponding to the shifter emulation profile.

2. The method of claim 1, wherein the administrator of the data store corresponds to one or more vehicle manufacturers.

3. The method of claim 1, further comprising:
    identifying, using the processing circuitry, a manual transmission vehicle build data structure that has at least one element of the vehicle build data structure;
    transmitting, using the processing circuitry, to the data store a query based on the manual transmission vehicle build data structure; and
    identifying, using the processing circuitry and via the data store, the shifter emulation profile, wherein the shift emulation profile corresponds to at least one element of the manual transmission vehicle build data structure.

4. The method of claim 1, wherein:
    a first sensor of the one or more sensors is arranged within the passenger compartment to capture hand motions performed within the passenger compartment; and
    a second sensor of the one or more sensors is arranged within the passenger compartment to capture foot motions performed within the passenger compartment.

5. The method of claim 4, wherein the one or more manual shifting motions comprises one or more of a hand motion corresponding to directional changes of a shifter within a manual transmission or a foot motion corresponding to pressing and releasing a clutch pedal.

6. The method of claim 1, further comprising generating, using the processing circuitry, a gear pattern for display corresponding to the shifter emulation profile, wherein the gear pattern is accessible via the passenger compartment.

7. The method of claim 6, wherein the gear pattern is updated for display based on the motion data and the at least one vehicle response profile.

8. The method of claim 7, wherein the motion data comprises at least one hand motion indicative of a modification to the gear pattern and at least one foot motion corresponding to an interaction with a clutch pedal.

9. The method of claim 1, wherein:
    the shifter emulation profile is a data structure of a vehicle emulation profile; and
    the vehicle emulation profile comprises a plurality of data structures comprising computer readable instructions that, when executed by the processing circuitry, cause one or more control units of the vehicle to emulate a comparable vehicle characterized by the vehicle emulation profile.

10. The method of claim 1, wherein the shifter emulation profile is stored in a memory of the vehicle based on operational permissions stored in the memory.

11. A system for emulating manually shifting gears of a transmission in a vehicle without a transmission configured for manual shifting, the system comprising:
    at least one data store that stores manual transmission emulation data structures; and
    a vehicle assembly, without a manual transmission, comprising control circuitry configured to:
        determine, based on a vehicle build data structure, that the vehicle lacks a transmission configured for manual shifting of the gears of the transmission;
        retrieve, from the data store, a shifter emulation profile, wherein the shifter emulation profile is generated by an administrator of the data store;
        generate, based on the shifter emulation profile, at least one vehicle response profile that comprises computer readable instructions for at least one control unit of the vehicle to execute during one or more operation states of the vehicle;

activate one or more sensors that collect motion data corresponding to a passenger compartment of the vehicle;

determine, based on the motion data, one or more manual shifting motions is being performed; and causing the at least one control unit to execute at least a portion of the at least one vehicle response profile based on the one or more manual shifting motions being performed to cause a vehicle response corresponding to the shifter emulation profile.

12. The system of claim 11, wherein the administrator of the data store corresponds to one or more vehicle manufacturers.

13. The system of claim 11, wherein the control circuitry is further configured to:
identify a manual transmission vehicle build data structure that has at least one element of the vehicle build data structure;
transmit to the data store a query based on the manual transmission vehicle build data structure; and
identify, via the data store, the shifter emulation profile, wherein the shift emulation profile corresponds to at least one element of the manual transmission vehicle build data structure.

14. The system of claim 11, wherein:
a first sensor of the one or more sensors is arranged within the passenger compartment to capture hand motions performed within the passenger compartment; and
a second sensor of the one or more sensors is arranged within the passenger compartment to capture foot motions performed within the passenger compartment.

15. The system of claim 14, wherein the one or more manual shifting motions comprises one or more of a hand motion corresponding to directional changes of a shifter within a manual transmission or a foot motion corresponding to pressing and releasing a clutch pedal.

16. The system of claim 11, wherein the control circuitry is further configured to generate a gear pattern for display corresponding to the shifter emulation profile, wherein the gear pattern is accessible via the passenger compartment.

17. The system of claim 16, wherein the gear pattern is updated for display based on the motion data and the at least one vehicle response profile.

18. The system of claim 17, wherein the motion data comprises at least one hand motion indicative of a modification to the gear pattern and at least one foot motion corresponding to an interaction with a clutch pedal.

19. The system of claim 11, wherein:
the shifter emulation profile is a data structure of a vehicle emulation profile; and
the vehicle emulation profile comprises a plurality of data structures comprising computer readable instructions that, when executed by the processing circuitry, cause one or more control units of the vehicle to emulate a comparable vehicle characterized by the vehicle emulation profile.

20. The system of claim 11, wherein the shifter emulation profile is stored in a memory of the vehicle based on operational permissions stored in the memory.

* * * * *